United States Patent
Dent et al.

(10) Patent No.: US 8,116,710 B2
(45) Date of Patent: Feb. 14, 2012

(54) CONTINUOUS SEQUENTIAL SCATTERER ESTIMATION

(75) Inventors: Paul Wilkinson Dent, Pittsboro, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 393 days.

(21) Appl. No.: 12/478,520

(22) Filed: Jun. 4, 2009

(65) Prior Publication Data

US 2010/0311350 A1 Dec. 9, 2010

(51) Int. Cl.
*H04B 17/00* (2006.01)
(52) U.S. Cl. ............. 455/226.1; 455/67.11; 455/67.13
(58) Field of Classification Search .... 455/67.11–67.14, 455/226.1, 437, 456.1; 370/310, 350, 334, 370/344, 347; 375/350, 232
See application file for complete search history.

(56) References Cited

U.S. PATENT DOCUMENTS

| | | | | |
|---|---|---|---|---|
| 6,470,047 B1* | 10/2002 | Kleinerman et al. | ......... | 375/232 |
| 2002/0105928 A1* | 8/2002 | Kapoor et al. | ................ | 370/334 |
| 2003/0162505 A1* | 8/2003 | Rantalainen et al. | ......... | 455/67.1 |
| 2004/0203468 A1* | 10/2004 | Dent et al. | ................. | 455/67.14 |
| 2005/0163257 A1 | 7/2005 | Keerthi | | |
| 2007/0110200 A1* | 5/2007 | Mergen et al. | ................ | 375/350 |
| 2007/0171847 A1* | 7/2007 | Demaj et al. | .................. | 370/310 |
| 2009/0275335 A1* | 11/2009 | Jalloul et al. | .................. | 455/437 |

* cited by examiner

*Primary Examiner* — Lana N Le
*Assistant Examiner* — Golam Sorowar

(57) ABSTRACT

The present invention uses newly received signal samples to update previously determined scatterer parameters, and therefore, reduces the processing effort required for characterizing scattering objects in a wireless channel. Broadly, the present invention determines a first set of scatterer parameters based on signal samples derived from signals received during one or more previous time intervals, and determines an updated set of scatterer parameters for a subsequent time interval based on the first set of scatterer parameters and the new signal samples. In one exemplary embodiment, the receiver uses a continuous sequential update process, e.g., a per-symbol-period inverse Prony process, to update the scatterer parameters. In another exemplar embodiment, the receiver uses an integrated Doppler approach to update the scatterer parameters.

12 Claims, 12 Drawing Sheets

$\theta 1 = e^{jw_{i,q1}}$
$\theta 2 = e^{jw_{i,q2}}$

CONTINUOUS SEQUENTIAL SCATTERER ESTIMATION

BACKGROUND

The present invention relates generally to channel estimation, and more particularly, to tracking scatterer parameters used to determine channel estimates as a transmitter and/or receiver moves within a wireless channel, where the scatterer parameters characterize scattering objects in the channel.

In a wireless communication system, a transmitted signal reflects off objects (e.g. buildings, hills, etc.) in the environment, referred to herein as scattering objects. The reflections arrive at a receiver from different directions and with different delays. The reflections or multi-paths can be characterized by a path delay and a complex delay coefficient. The complex delay coefficients show fast temporal variation due to the mobility of the vehicle while the path delays are relatively constant over a large number of OFDM symbol periods.

Channel estimation is the process of characterizing the effect of the radio channel on the transmitted signal. Channel estimates approximating the effect of the channel on the transmitted signal may be used for interference cancellation, diversity combining, ML detection, and other purposes. Many channel estimation techniques in common use do not produce sufficiently accurate estimates of the channel for use by higher order modulations. Further, it is difficult to predict how the channel will change due to the mobility of the vehicle. Therefore, there is a need for new channel estimation techniques that will produce more accurate channel estimates for higher order modulation and enable channel prediction and tracking.

SUMMARY

Co-pending application Ser. No. 12/478,473, which is incorporated herein by reference, provides an improved channel estimation method based on the accurate characterization of scattering objects. The Ser. No. 12/478,473 application characterizes the scattering objects by determining a set of scatterer parameters based on signal samples derived from signals received over an evaluation period. The scatterer parameters include path delays as well as the scattering coefficients and associated Doppler frequencies that characterize the scattering objects in the wireless channel. The present invention extends the teachings of the Ser. No. 12/478,473 application to include tracking the scattering object characterizations as they change due to movement of the transmitter and/or receiver within the wireless channel. More particularly, the present invention enables the receiver to track the scatterer parameters based on signal samples derived from signals received after the initial evaluation period without requiring the receiver to repeat the entire calculation process of the Ser. No. 12/478,473 application. Thus, the present invention enables the receiver to use signal samples derived from newly received signals to update an existing set of scatterer parameters.

Broadly, a wireless receiver according to the present invention determines a first set of scatterer parameters based on signal samples derived from signals received during one or more previous time intervals, estimates a channel frequency response for a subsequent time interval, and updates the scatterer parameters in the first set based on the estimated channel frequency response to determine an updated set of scatterer parameters for the subsequent time interval. The receiver may use the updated set of scatterer parameters to determine the channel estimates for the wireless channel. In one exemplary embodiment, the receiver uses a continuous sequential update process, e.g., a per-symbol-period inverse Prony process, to update the scatterer parameters. In another exemplar embodiment, the receiver uses an integrated Doppler approach to update the scatterer parameters.

In the continuous sequential update embodiment, the receiver updates the scatterer parameters by updating noise whitened channel frequency responses determined for an initial evaluation period. The receiver uses the updated noise whitened channel frequency responses to update the first set of scatterer parameters. More particularly, the receiver determines a first set of noise whitened channel frequency responses based on signal samples derived from signals received during an initial evaluation period comprising a plurality of time intervals, and determines a first set of scatterer parameters for the initial evaluation period based on the first set of noise whitened channel frequency responses. Subsequently, the receiver determines a second set of noise whitened channel frequency responses based on signal samples derived from signals received during a subsequent time interval, and determines an updated set of noise whitened channel frequency responses based on the first and second sets of noise whitened channel frequency responses. The receiver then updates the first set of scatterer parameters based on the updated noise whitened channel frequency responses to determine the updated set of scatterer parameters. The receiver may use the updated set of scatterer parameters to determine new channel estimates.

In the integrated Doppler embodiment, the receiver first predicts scatterer parameters for the subsequent time interval based on previously determined scatterer parameters, and corrects errors in the prediction based on differences between channel frequency responses derived from the predicted scatterer parameters and channel frequency responses derived from samples of a signal received during the subsequent time interval. The receiver may use the updated scatterer parameters to determine new channel estimates.

DETAILED DESCRIPTION

Transmitted signals traveling through wireless communication channels typically encounter several scattering objects, e.g., buildings, mountains, trees, etc., before reaching a receiver. As used herein, the term "scattering object" refers to both single scattering objects and clusters of scattering objects that are too close to separate. Channel estimation is the process of characterizing the effect of these scattering objects on the transmitted signal. Channel estimates typically used by receivers can include complex coefficients of the channel impulse response at a number of equally-spaced delays, e.g., equally-spaced chip delays in a CDMA (Code Division Multiple Access) system, as well as complex coefficients indicative of the channel frequency response at a number of equally-spaced frequencies, e.g., equally-spaced subcarrier frequencies in an OFDM (Orthogonal Frequency Division Multiplex) system. The receiver may use channel estimates approximating the effect of the channel on the transmitted signal for interference cancellation, diversity combining, ML detection, and other purposes.

Figure 1:
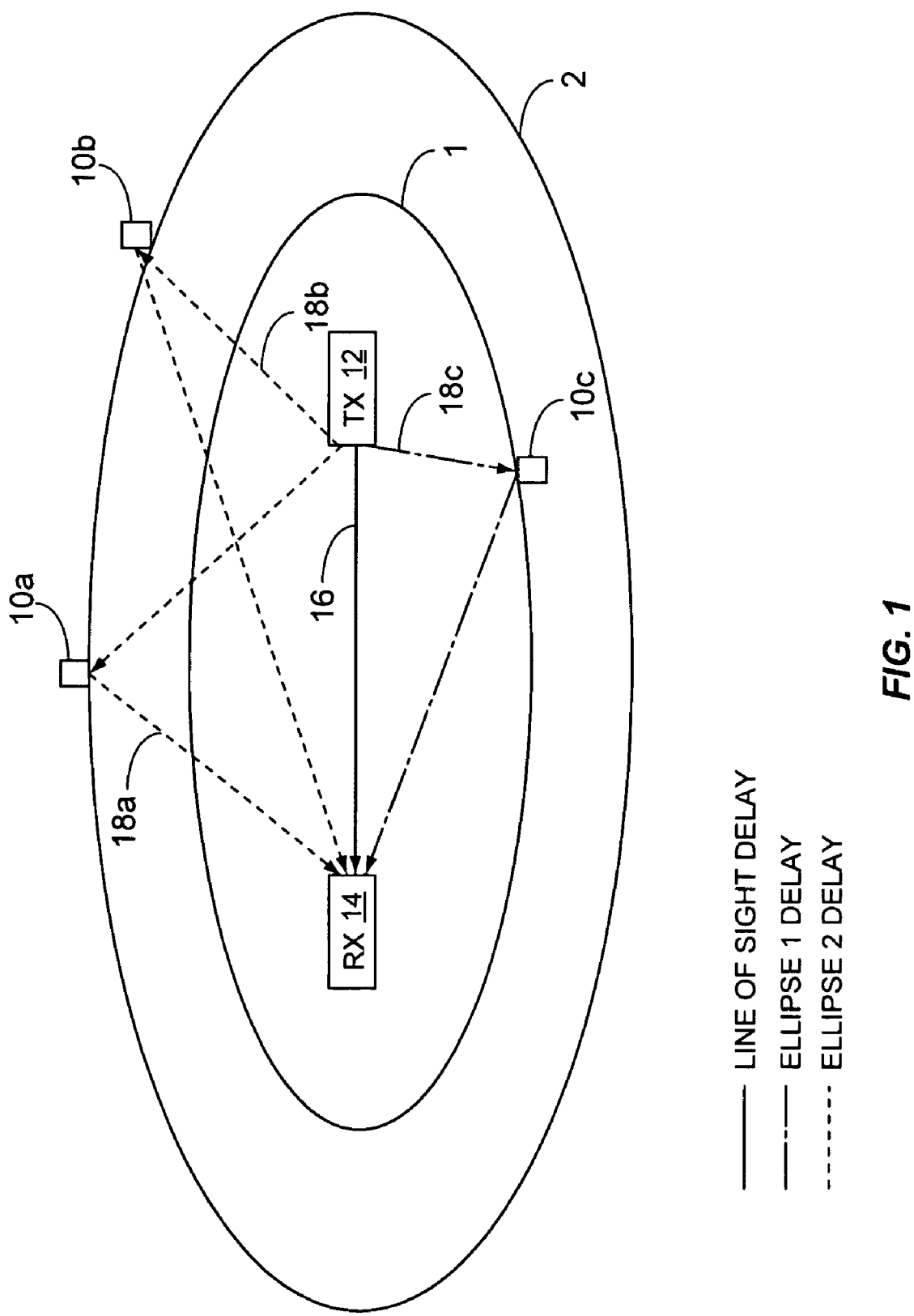
FIG. 1 shows the relationship between different scattering objects and different path delays relative to a transmitter and receiver in a wireless system.

In order to characterize the scattering objects, the receiver determines the path delays, complex delay coefficients, and/or Doppler parameters corresponding to the scattering objects. Ideally, each scattering object in the multi-path channel corresponds to a different path delay. However, there are scenarios where different scattering objects cause reflected signals to have the same path delay even though the reflected signals traverse different paths. For example, FIG. 1 shows a plurality of ellipses surrounding a transmitter 12 and a receiver 14, where the transmitter 12 and receiver 14 mark the foci of the ellipses, where a scattering object 10 falls on one of the ellipses, and where different ellipses correspond to different path delays. Thus, the paths of different scattering objects 10 positioned along the same ellipse have the same path delay, while the paths of different scattering objects 10 positioned along different ellipses have different path delays. For example, scattering objects 10a, 10b both fall on ellipse 2, while scattering object 10c falls on ellipse 1. Thus, the path delay associated with path 18c differs from the path delay associated with path 18a or path 18b, where path 18a and path 18b both have the same path delay. Because scattering objects 10a and 10b apply the same path delay to a transmitted signal, receiver 14 cannot use path delay alone to distinguish scattering object 10a associated with path 18a from scattering object 10b associated path 18b.

Figure 2:
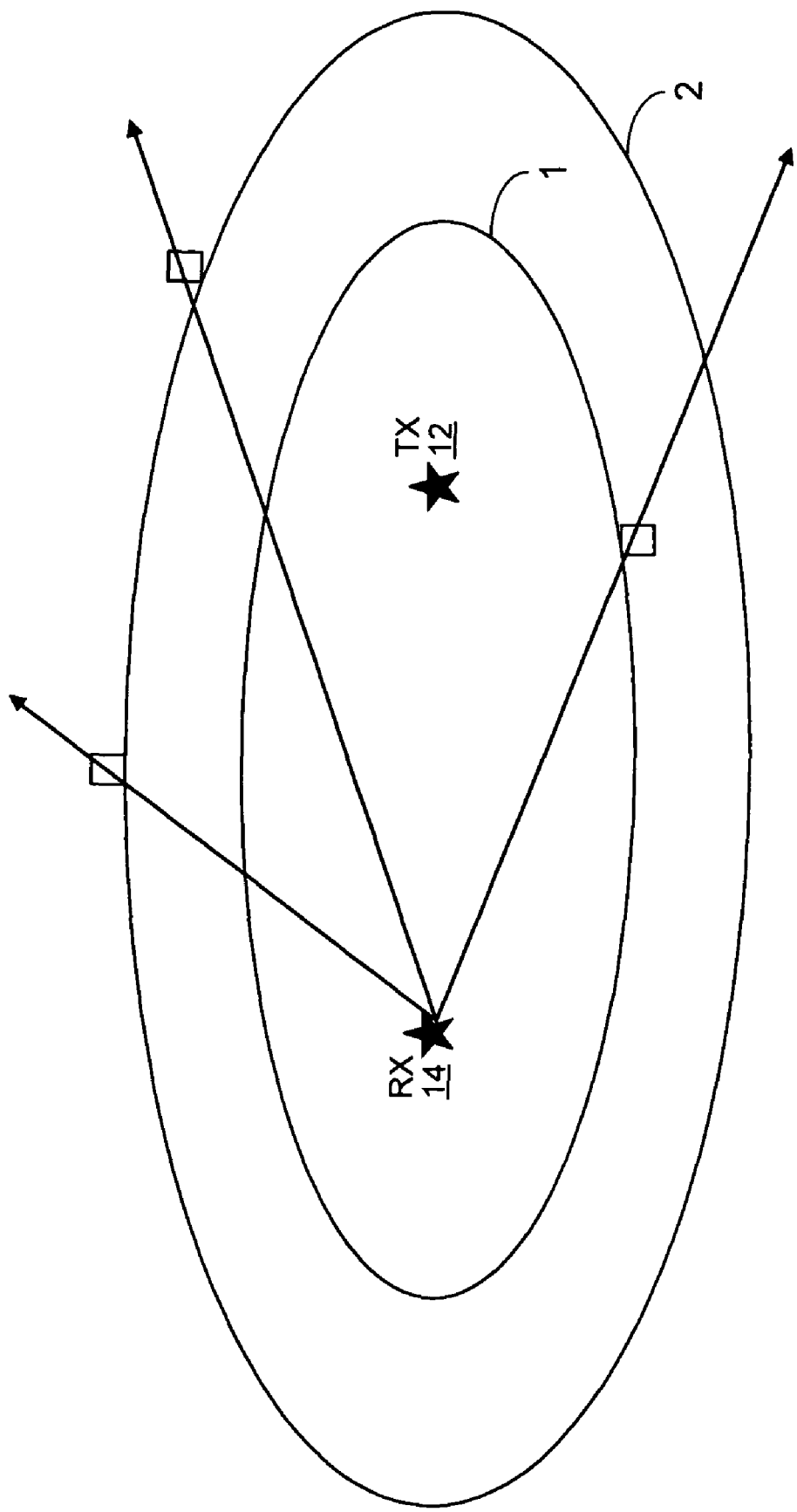
FIG. 2 shows exemplary Doppler frequency vectors associated with the scattering objects relative to the receiver at a particular instant of time.

Because path delay alone cannot be used to characterize the scattering objects 10, the receiver 14 may use another characterizing parameter, such as a Doppler parameter, to further characterize and distinguish the different scattering objects 10. For example, objects 10 with the same delay at different angular positions on the same delay-ellipse exhibit different Doppler shifts for moving a transmitter 12 and/or receiver 14. Thus, receiver 14 may determine the Doppler shift (or the equivalent rate of change of delay) to further distinguish between scattering objects 10 having identical path delays. FIG. 2 shows an example of the different Doppler frequency vectors associated with the scattering objects relative to a moving receiver 14 at a particular instant of time. By determining how the Doppler effect changes the complex delay coefficients over time, e.g., over multiple OFDM symbol periods, receiver 14 may distinguish different paths 18 having the same path delay but caused by different scattering objects 10.

Accordingly, the receiver 14 of the present invention determines a set of scatterer parameters that characterize different scattering objects 10. Exemplary scatterer parameters comprise the path delay, complex scattering coefficients, and rate of change (e.g., Doppler frequency or delay rate of change) due to movement of the receiver 14 and/or transmitter 12. U.S. patent application Ser. No. 12/478,473 to current applicants provides one exemplary means for determining scatterer parameters for multiple scattering objects over an evaluation period, e.g., multiple OFDM symbol periods. The Ser. No. 12/478,473 application determines a set of scatterer parameters for a plurality of scattering objects in a wireless channel over an evaluation period. The determined set of scatterer parameters comprises a set of scattering coefficients and associated rates of change (e.g., Doppler frequency or delay rate of change) for each of the path delays. Each set of scattering coefficients correspond to one or more scattering objects 10 having the same path delay. The receiver 14 may use the scatterer parameters to determine channel estimates for the time intervals of the evaluation period.

As the transmitter 12 and/or receiver 14 move within the channel, the scatterer parameters for individual scattering objects 10 may change. Receiver 14 may track the scatterer parameters by independently determining a new set of scatterer parameters, e.g., as described in the Ser. No. 12/478,473 application, for each new evaluation period. However, the processing power required for such an effort may be unnecessarily large and unnecessarily repetitive. Thus, an alternative method for tracking scatterer parameters is desirable.

Figure 3:
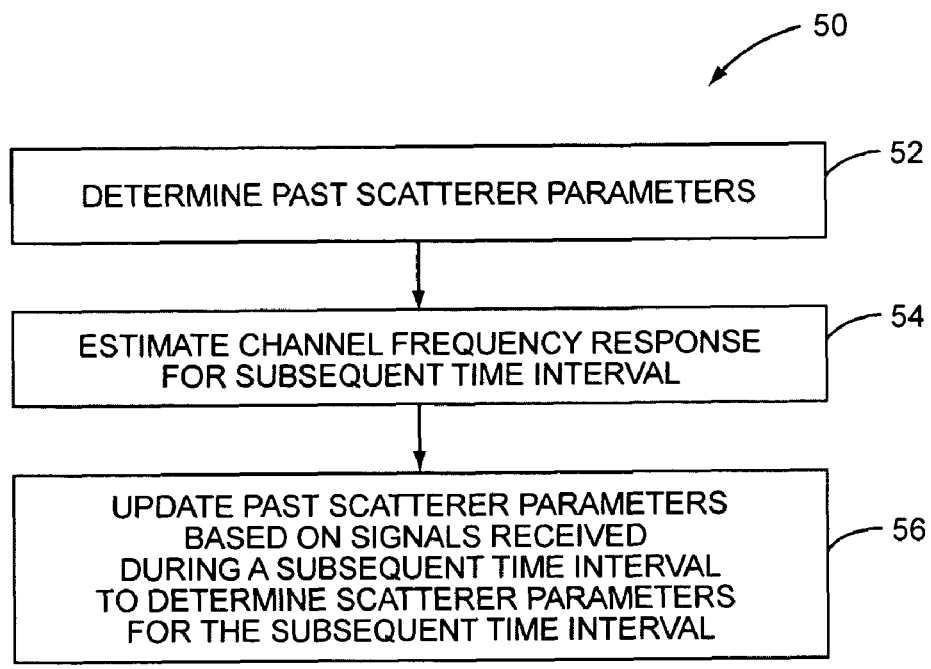
FIG. 3 shows one process for tracking scatterer parameters according to one exemplary embodiment of the present invention.

FIG. 3 shows one exemplary method 50 implemented by the receiver 14 for tracking scatterer parameters. The receiver 14 determines a first set of scatterer parameters based on one or more signal samples received during one or more previous time intervals (block 52), and estimates a channel frequency response for a subsequent time interval (block 54). Based on the first set of scatterer parameters, a new set of signals samples received during the subsequent time interval, and the estimated channel frequency response, the receiver 14 updates one or more scatterer parameters in the first set to determine an updated set of scatterer parameters for the subsequent time interval (block 56). The present invention provides several methods for implementing the estimating and updating processes of blocks 54 and 56. In one embodiment, scatterer parameters may be tracked using a continuous sequential update process, e.g., a per-symbol-period inverse Prony process. In another embodiment, scatterer parameters may be tracked using an integrated Doppler approach. The following describes both approaches in terms of OFDM signal samples in OFDM symbols received over multiple OFDM symbol periods. It will be appreciated, however, that the present invention applies to any frequency division multiplexed signal samples corresponding to multiple time intervals of an evaluation period, where the receiver uses the signal samples to characterize a wireless communication channel and/or scattering objects in the wireless communication channel.

Figure 4:
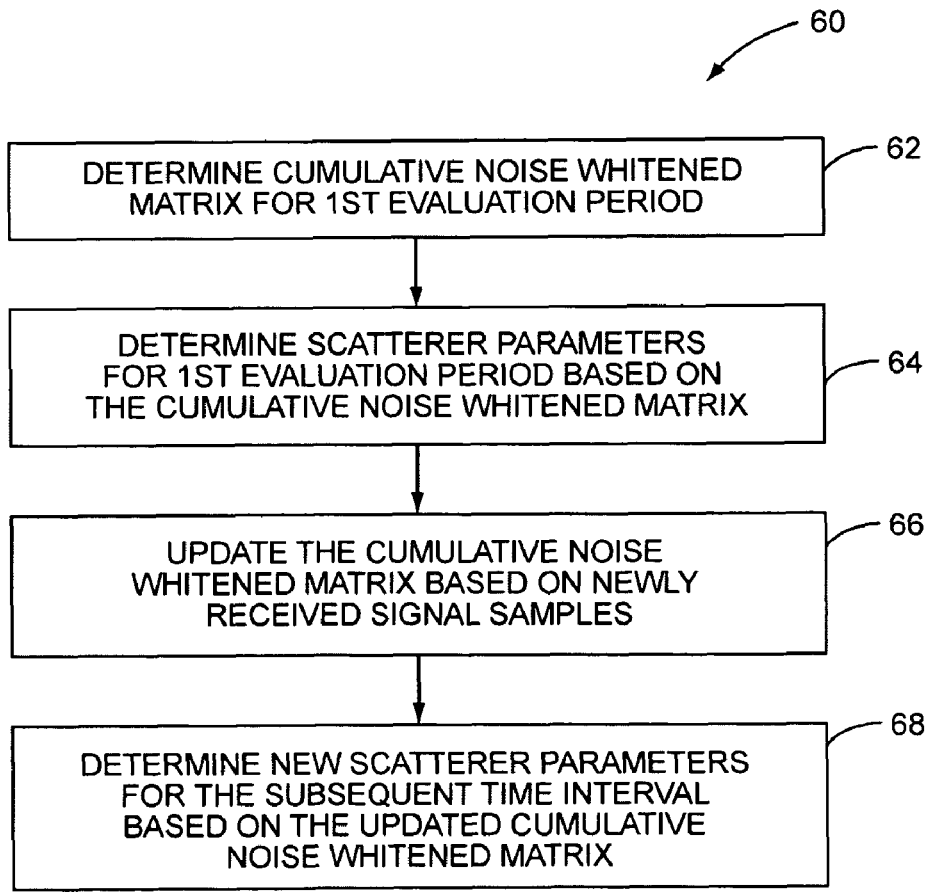
FIG. 4 shows one CSIPA process for tracking scatterer parameters according to one exemplary embodiment of the present invention.

FIG. 4 shows one exemplary embodiment of the continuous sequential update process 60, where receiver 14 updates the set of scatterer parameters using information obtained from the most recently received OFDM symbol. Broadly, the receiver 14 determines a first set of scatterer parameters for first evaluation period as described by the above-referenced Ser. No. 12/478,473 patent application, and updates the first set of scatterer parameters as new symbols arrive at the receiver 14. More particularly, receiver 14 determines a cumulative noise whitened matrix for the first evaluation period, where elements of the noise whitened matrix represent the noise whitened channel frequency responses for multiple path delays (block 62). The receiver 14 then determines the first set of scatterer parameters for the first evaluation period based on the cumulative noise whitened matrix (block 64). When a new OFDM symbol arrives at receiver 14, the receiver 14 updates the cumulative noise whitened matrix based on the signal samples in the new OFDM symbol (block 66), and determines a new set of scatterer parameters based on the updated cumulative noise whitened matrix (block 68).

In the simplest embodiment, receiver 14 determines new noise whitened channel frequency responses based on the new signal samples derived from the newly received symbol, and adds the new noise whitened channel frequency responses to the previously determined noise whitened channel frequency responses to update the cumulative noise whitened matrix. While this embodiment is the simplest, it also considers the channel frequency responses corresponding to all previously received OFDM symbols. Such a "cumulative forever" approach therefore gives the newest OFDM symbol and the oldest OFDM symbols equal consideration.

In another embodiment, the receiver 14 eliminates the effects of the oldest OFDM symbols by using a fixed-size sliding window to update the cumulative noise whitened matrix. More particularly, receiver 14 determines the new noise whitened channel frequency responses for the new signal samples. Subsequently, the receiver 14 updates the cumulative noise whitened matrix by adding the new channel frequency responses to and subtracting the oldest channel frequency responses from the previously determined cumulative noise whitened matrix.

In still another embodiment, receiver 14 uses exponential forgetting to update the cumulate noise whitened matrix. With exponential forgetting, the receiver 14 progressively de-weights older channel frequency responses so that the updated cumulative noise whitened matrix gives more consideration to the channel frequency responses determined for the more recently received OFDM symbols. Accordingly, receiver 14 scales a current cumulative noise whitened matrix by a factor less than unity, and then generates an updated cumulative noise whitened matrix by adding the new channel frequency responses determined based on the new OFDM symbol to the scaled cumulative noise whitened matrix.

An alternative embodiment of the present invention uses an integrated Doppler approach to track the scatterer parameters for different scattering objects. This embodiment does not rely on or maintain the previously discussed set of scatterer parameters, but instead uses a Kalman tracking process that tracks path delays and their derivatives. The Kalman tracking process successively refines scatterer parameter estimates based on how predicted channel frequency responses derived from predicted scatterer parameters compare to actual channel frequency responses derived from the newly received signal samples.

In one embodiment of the integrated Doppler approach, the scatterer parameters for a new symbol period are predicted from the scattering coefficients, their corresponding path delays, and their derivatives determined for a previous symbol period. Subsequently, receiver 14 predicts channel frequency responses for the new symbol period based on the predicted scatterer parameters, and compares the predicted channel frequency responses to the actual channel frequency responses observed for the new symbol period. Based on the resulting difference, the receiver 14 corrects the predicted scatterer parameters so as to reduce the error for future predictions.

The present invention also provides ways to track scattering objects 10 in the wireless channel. Over long periods of time, a tracked scatterer parameter may weaken as the corresponding scattering object 10 becomes more distant, while other new scatterer parameters strengthen as the corresponding scattering objects become nearer. To address this, the present invention may use the integrated Doppler approach to track scatterer parameters for an existing set of scattering objects, and use a version of the continuous sequential update process to search for and then add or remove scatterer parameters corresponding to stronger or weaker scattering objects, respectively.

Before describing the details of the tracking process of the present invention, the following provides the details associated with the Ser. No. 12/478,473 application. Broadly, the Ser. No. 12/478,473 invention determines the actual path delay and Doppler parameter information for a plurality of scattering objects in a wireless channel. Based on the path delay and Doppler frequency information, the receiver determines channel estimates useful for higher order modulation processing, channel prediction, etc. More particularly, the receiver 14 applies a frequency-to-time transform to a plurality of OFDM subcarrier signal samples received over a plurality of OFDM symbol periods to determine a set of non-equally spaced path delays and a set of associated complex delay coefficients. Further, the receiver 14 applies a time-to-frequency transform to the complex delay coefficients determined for individual path delays over multiple OFDM symbol periods to determine a set of Doppler parameters comprising a plurality of non-equally spaced Doppler frequencies and their corresponding scattering coefficients for individual path delays.

Because the transform operations of the Ser. No. 12/478, 473 invention are not constrained to determining output values at equally spaced time or frequency intervals, the non-equally spaced path delays, the associated complex delay coefficients, and the associated Doppler parameter sets have fewer errors than those produced by conventional techniques. The transform operations described therein therefore fully characterize the scattering objects 10 while avoiding the accuracy problems of the prior art. The increased accuracy of the resulting scattering object characterizations enable the receiver 14 to better track the channel estimates.

Figure 5:
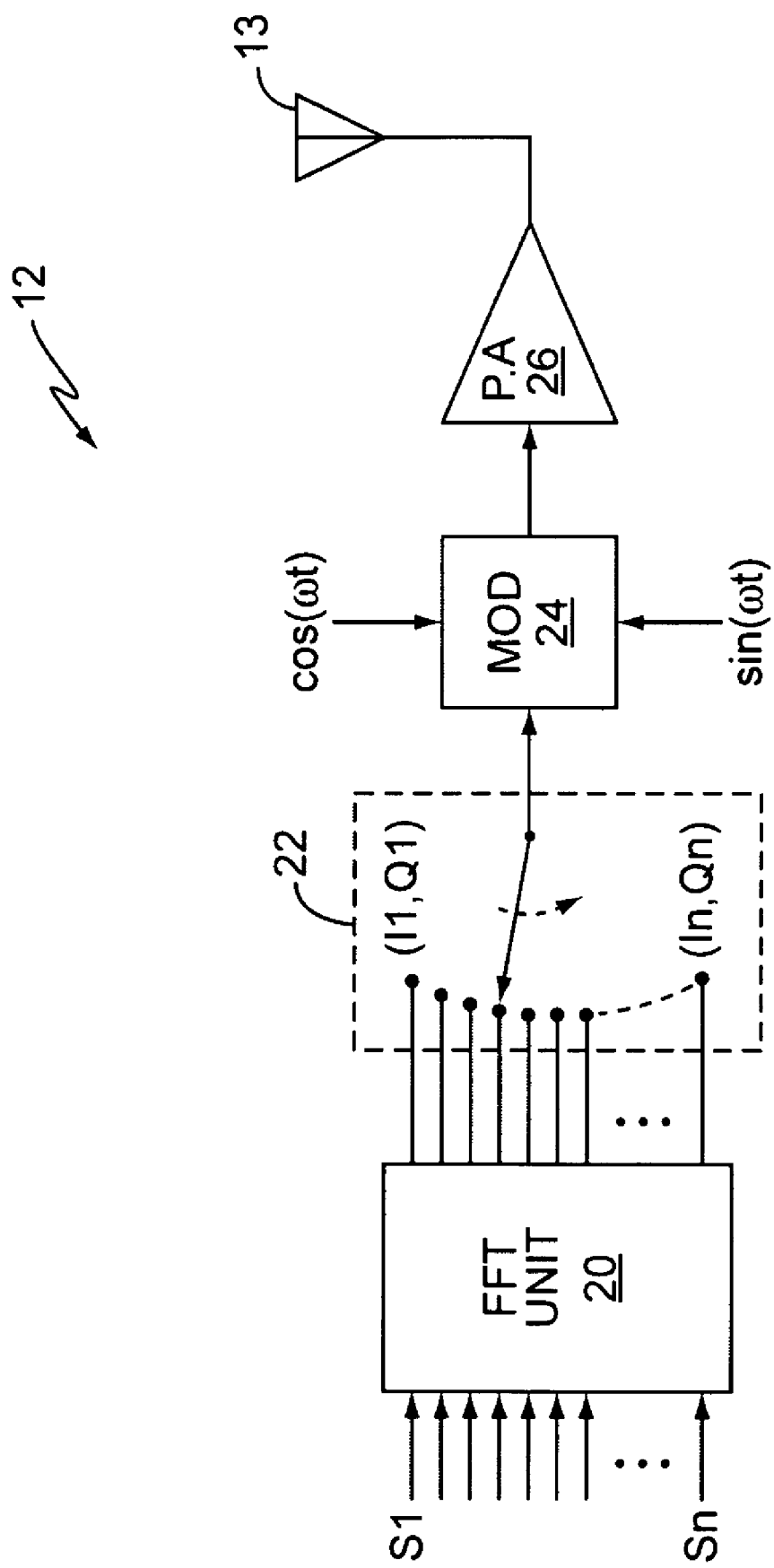
FIG. 5 shows an exemplary transmitter.
Figure 6:
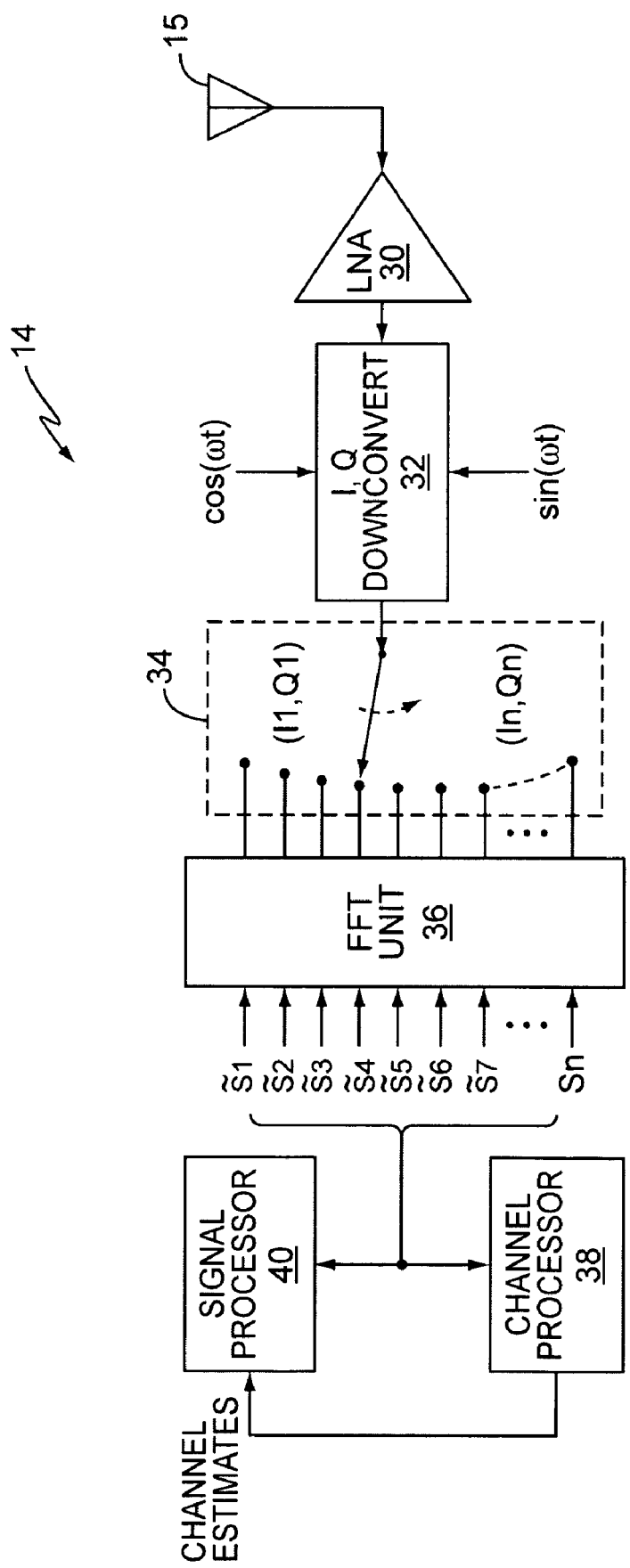
FIG. 6 shows an exemplary receiver according to an exemplary embodiment of the present invention.

To facilitate the following detailed explanation, FIGS. 5 and 6 first show simplified internal details of an exemplary OFDM transmitter 12 and OFDM receiver 14, respectively. Transmitter 12 comprises an antenna 13, Inverse Fourier transform unit 20, parallel-to-serial converter 22, modulator 24, and power amplifier 26. Generally, the transmitter uses an Inverse Discrete Fourier Transform (IDFT) to encode symbols, and the receiver uses a Discrete Fourier Transform (DFT) to decode signals. However, the IDFT and DFT may be interchanged, and are so similar that they are simply referred to herein as Fourier Transform units 20. Signal values to be transmitted (S1 ... Sn) are input to the Fourier transform unit 20 which may be a specialized, hardwired FFT (or IFFT) circuit or a DSP implementation. Fourier transform unit 20 transforms the n input values to at least n output values. It is advantageous to use more than n output values, termed "oversampling". For example, n=700 input values could be transformed to m=1024 output values, using a 1024-point FFT. The 524 unused inputs would be set to zero, representing 262 empty spectral bins on either side of the 700 spectral bins used for the 700 input values. Oversampling simplifies subsequent anti-aliasing filtering needed to limit out-of-band spectral energy.

Parallel-to-serial unit 22 converts the output values of the Fourier transform unit 20 to serial form by selecting them successively in a fixed order. Each value is complex, so the serial stream comprises a stream of real parts and a stream of imaginary parts, i.e., a stream of (I, Q) values. The stream of I-values and the stream of Q-values are converted to continuous-time I and Q signals by digital-to-analog conversion and filtering within modulator 24. The filter frequency response is required to pass frequencies corresponding to the used spectral bins, e.g., the 700 bins exemplified above, while attenuating frequencies beyond the exemplary 1024 bins. Thus, oversampling leaves a margin between the required passband and the required stop band so that the filter is not required to have an impossibly steep rate of cut-off. The modulator 24 further uses the continuous-time I and Q signals to modulate cosine and sine wave carrier frequency signals, respectively, to generate an OFDM modulated radio frequency signal, which is amplified to a transmit power level in amplifier 26 and transmitted via antenna 13.

FIG. 6 shows a receiver 14 according to one exemplary embodiment of the present invention. Receiver 14 comprises an antenna 15, front-end receiver elements (e.g., amplifier 30, down converter 32, serial-to-parallel converter 34, and Fourier transform unit 36), channel processor 38, and signal processor 40. The front-end receiver elements generate a plurality of signal samples corresponding to a plurality of frequencies from a signal received via antenna 15. More particularly, amplifier 30 amplifies an OFDM symbol received via antenna 15, and down converter 32 down converts the amplified OFDM symbol to the complex digital baseband. The down converter 32 may comprise any known down converter that has means to select an operating frequency, means to filter the received signal to select the signal bandwidth centered on the selected operating frequency, and means to sample and analog-to-digital convert the filtered signal to generate the complex digital I, Q signals. For example, down converter 32 may comprise a zero-IF or homodyne down converter, a low-IF down converter, or a conventional superheterodyne down converter in which the final IF signal is demodulated by mixing with cosine and sine reference signal waveforms in a quadrature mixer arrangement. Exemplary down converters include those described by U.S. Pat. No. 5,048,059 (reissued as RE37,138), U.S. Pat. Nos. 5,084,669, and 5,070,303.

As in the case of the transmitter 12, it is useful to oversample the filtered signal in order to permit a relaxed specification for the signal selection filters. The digital I, Q samples from the I, Q downconverter are then assembled into a block by serial-to-parallel converter 34, which can for example comprise a DSP memory. The block is then Fourier Transformed by Fourier transform unit 36 which is the reverse or conjugate process to the transmit Fourier transform unit 20. The output of Fourier transform unit 36 comprises the same number of samples as in the input block, which, with oversampling, is greater than n. Only n samples are used however, and the rest, which correspond to out-of-band spectral components not completely suppressed by the signal selection filters, are discarded. The output samples $\tilde{S}1$ to $\tilde{S}n$ correspond to the samples input to the transmitter 12, with the addition of transmission noise and any distortion effects caused by the propagation channel. Channel processor 38 processes samples $\tilde{S}1$ to $\tilde{S}n$ to determine the channel estimates. Signal processor 40 uses the channel estimates to process (e.g., decode) samples $\tilde{S}1$ to $\tilde{S}n$ to recover the transmitted data symbols S1 to Sn.

More particularly, channel processor 38 applies a frequency-to-time transform to the pilot samples within samples $\tilde{S}1$ to $\tilde{S}n$ to determine a set of non-equally spaced path delays and the corresponding complex delay coefficients. It will be appreciated that the frequency-to-time transform may be jointly applied to a matrix of pilot symbols obtained from multiple OFDM symbol periods to determine a matrix of complex delay coefficients, where a given row of the delay coefficient matrix corresponds to a given OFDM symbol period, and where a given column of the delay coefficient matrix corresponds to a given path delay within the set of non-equally spaced path delays. It will further be appreciated that the joint operation may alternately be replaced with an individual operation, where the frequency-to-time transform is individually applied to individual sets of pilot samples from individual OFDM symbol periods. In this case, different rows of the delay coefficient matrix are produced by individual frequency-to-time transform operations applied to signal samples from individual OFDM symbols, where different rows of the matrix correspond to different OFDM symbol periods. The complex delay coefficients in each column of the resulting matrix generally correspond to a common path delay, plus or minus a small path delay differential. It will be appreciated that while the operation of jointly determining a common set of non-equally spaced delays that apply over multiple different OFDM symbol periods represents a preferred implementation, other implementations of the invention may determine the delay values independently for each OFDM symbol period.

Subsequently, channel processor 38 applies a time-to-frequency transform to individual columns of the delay coefficient matrix to determine a Doppler spectrum for each path delay. The determination of a Doppler Spectrum from a column of delay coefficients for a given path delay presumes that the path delay is common to all the OFDM symbol periods of the column, and thus is optimum when the receiver determines the path delays jointly over multiple different OFDM symbol periods. However, individual determination of the path delays could be used for each OFDM symbol period, providing the delay coefficients in individual columns of the resulting matrix are conformed to the same path delay prior to Doppler analysis of the column of complex delay coefficients. This conforming operation may be achieved by rotating each delay coefficient in phase angle by $W_o dT$, where $W_o$ represents the center frequency of the signal, and dT represents the amount of delay change needed to conform the path delay for a complex delay coefficient in a particular column to a common delay for that column.

In any event, each Doppler spectrum comprises a set of determined Doppler parameters, which each comprise a plurality of non-equally spaced Doppler frequencies and their corresponding complex scattering coefficients. Unlike the joint determination of the path delays over different OFDM symbol periods, determining the Doppler spectra is not a joint operation over different path delays. Instead, the channel processor 38 determines the Doppler spectrum individually for a given path delay, e.g., delay column. Collecting different sets of Doppler parameters determined for different ones of the non-equally spaced path delays into a matrix produces a Doppler parameter matrix, where a given column of the Doppler parameter matrix provides a set of Doppler parameters for a given path delay from the set of non-equally spaced path delays, and where each entry in the Doppler parameter matrix comprises at least a Doppler frequency and an associated complex coefficient for a particular path delay. Channel processor 38 uses the non-equally spaced path delays and corresponding Doppler parameters to characterize the channel, e.g., to determine the channel estimates as described herein or according to any known means. Because the path delays and Doppler parameters have significantly more accuracy than those obtained from conventional approaches, the resulting channel estimates are also significantly more accurate, as discussed above.

The simplified receiver 14 of FIG. 6 was deliberately illustrated in the same form as the simplified transmitter 12 of FIG. 5 to explain how the transmitter 12 and receiver 14 processes are essentially inverses of each other, with the result that n complex samples (S1, S2, . . . , Sn) input to the transmitter 12 appear at the receiver output, effectively establishing n parallel channels of communication. These are normally employed to send digital information, using a suitable modulation constellation to map bit patterns to points in the complex I, Q plane. A practical OFDM communication system comprises many more details than shown in FIGS. 5 and 6, such as pulse shaping, cyclic prefixes, equalizers and such, which, although not essential to an understanding of the current invention, may be found in the following disclosures to the current applicant filed in the United States: "Method and Apparatus for Communicating with Root-Nyquist, Self-Transform Pulse Shapes" (U.S. Patent Provisional Application Ser. No. 60/924673 filed 25 May 2007, and subsequent PCT Application Serial No. PCT/US08/64743 filed 23 May 2008), "Use of Pilot Code in OFDM and Other Non-CDMA Systems" (U.S. patent application Ser. No. 12/255,343 filed 21 Oct. 2008), and "Compensation of Diagonal ISI in OFDM Signals" (U.S. patent application Ser. No. 12/045,157 filed 10 Mar. 2008), all of which are hereby incorporated by reference herein.

A detailed description of the improved method will be made using an exemplary OFDM transmission scheme. In the following description, reference will be made to different time periods and intervals. A clarification of the different time periods involved will therefore be given first, followed by the details associated with the inventive transforms described herein.

A wideband signal is produced by modulating a carrier frequency with a time-waveform that changes rapidly, in a short period that may be termed a modulation interval, a chip period, or the like. This is the shortest time period involved. An OFDM symbol comprises a large number of such modulation intervals—at least as many as there are subcarrier frequencies in the OFDM symbol. The set of modulation samples, spaced in time by the modulation interval, is computed by Inverse Fourier Transforming a set of phases and amplitudes, one per subcarrier frequency. Data symbols are encoded into the choice of each phase and amplitude by some chosen modulation scheme, such as 256 QAM, so that every subcarrier frequency carries a data symbol.

The total duration of the time-waveform output by the IFT is equal to the reciprocal of the subcarrier frequency spacing, and is called the OFDM symbol period. This may be extended by appending a so-called cyclic prefix, but some OFDM systems, known as Pulse-Shaped OFDM, do not need to extend the duration of the OFDM symbol to accommodate a cyclic prefix. In effect, the cyclic repeats of the OFDM symbol in pulse shaped OFDM symbols are permitted to overlap adjacent symbols, and therefore do not add a time-overhead. Therefore the potential use of a cyclic prefix is ignored for the rest of the discussion. A number of OFDM symbols may be collected together over a total analysis time interval, the total analysis time interval therefore being an integral number of OFDM symbol periods.

Reference will be made to various time domains and frequency domains which are also clarified herein. The frequency domain of the signal comprises the frequency span from the first to the last OFDM subcarrier frequency used. The OFDM signal also exists as a time waveform in the signal time domain, which is related to the signal frequency domain by the Fourier Transform.

A second frequency domain arises when looking at variations in signals arriving via scattered rays that are received from different objects with different Doppler shifts, due to having different relative velocities to the communicating station. If data symbol modulation is removed, the signal on any subcarrier frequency would still therefore be perceived to vary with time, and therefore possess a spectrum of finite width. This Doppler spectrum exists in the frequency domain also, but is very narrow even compared to a single OFDM subcarrier frequency spacing. For example, a typical subcarrier frequency spacing is 15 kHz, while a typical Doppler spectrum is only 100-200 Hz wide. The signal time variation that gives rise to the Doppler spectrum is from one OFDM symbol period to the next, and a total analysis interval of many OFDM symbol periods is required to resolve the Doppler spectrum.

The value of the amplitude and phase of a given sub-carrier frequency in a given OFDM symbol, ignoring data symbol modulation, is the result of the sum of many scattered waves of different phase and amplitude, and these may add constructively or destructively in each sub-carrier frequency bin. If the resultant phase and amplitude is plotted versus sub-carrier frequency, it will exhibit a frequency variation which is the channel frequency response. If the channel frequency response is inverse frequency transformed, the channel impulse response will be obtained. The impulse response indicates very approximately that the composite signal comprises the sum of a number of relatively delayed rays, and is a plot of phase and amplitude versus delay. This is therefore referred to as the Delay Domain.

Orthogonal Frequency Division Multiplexing (OFDM) is one method of reducing the complexity of equalizing methods needed to communicate high data rates in a multi-path channel. Using the transmitter 12 and receiver 14 described above, signals received from an OFDM transmitter 12 are applied to the Fourier transform unit 36 to produce a complex numerical value in each of the plurality of subcarrier frequency bins for each OFDM block period. For example, the receiver 14 may process data comprising a 1296 sub-carrier OFDM system having 15 kHz subcarrier frequency spacing, each OFDM symbol period thus being approximately 66.7 μs in duration (the reciprocal of 15 kHz). The total occupied bandwidth of such a signal is a little over 1296×15 kHz or 19.44 MHz, and therefore, the symbol period is 1/19.44 MHz, or 51.44 ns. For generating and analyzing such a signal, a 2048-point Fourier transform unit 36 may be used, leaving a margin for filtering as described above. In the above test system, every fourth subcarrier frequency contained a known pilot symbol, meaning that the phase of the pilot sub-carrier frequencies were set to values that were pre-agreed between receiver 14 and transmitter 12. Thus, 324 pilot symbols are transmitted per OFDM symbol interval of 66.7 μs. The pilot symbols are used to estimate the phase in adjacent channels by interpolation in both the frequency and time domain. To collect data from the test system, the complex value received for each pilot subcarrier frequency was averaged over 8 successive OFDM symbol periods to give one value per 8×66.7=533 µs. This is adequate sampling density for modest relative velocities between the transmitter 12 and receiver 14. Thus, as a first step in smoothing channel estimates, an average along the time domain of samples corresponding to the same frequency in the frequency domain was employed. This is typical of conventional channel estimation methods, but not the preferred implementation according to this invention.

If the 324 pilot symbols are extracted from the output of the receiver Fourier transform unit 36 and the known phase rotations of the pre-agreed pilot symbol pattern are removed, the result is an estimate of the transmission channel phase and attenuation at equally spaced points spaced 60 kHz apart along the frequency domain. These may be inverse frequency transformed to produce complex delay coefficients. In some CDMA and TDMA systems, these complex delay coefficients may represent a first estimate of the channel impulse response of the channel.

In some systems, the pilot symbols are equispaced in both a first half of the subcarriers and in a second half of the subcarriers, but the spacing between the first half and the second half is non-commensurate. This can be handled by treating the first half and second half symbols as two separate symbols with frequency displacement between the pilots of one half and the pilots of the other half. The method described herein can handle an arbitrary frequency displacement between the pilots of one symbol, or part symbol, and the pilots of another symbol, or part symbol, and still process them jointly to uncover a common set of scatterer delays. Moreover, when symbols that have already been decoded are included in the calculation, it is possible that all of the OFDM subcarrier frequencies can be used, and not just those bearing known pilot symbols.

Figure 7:
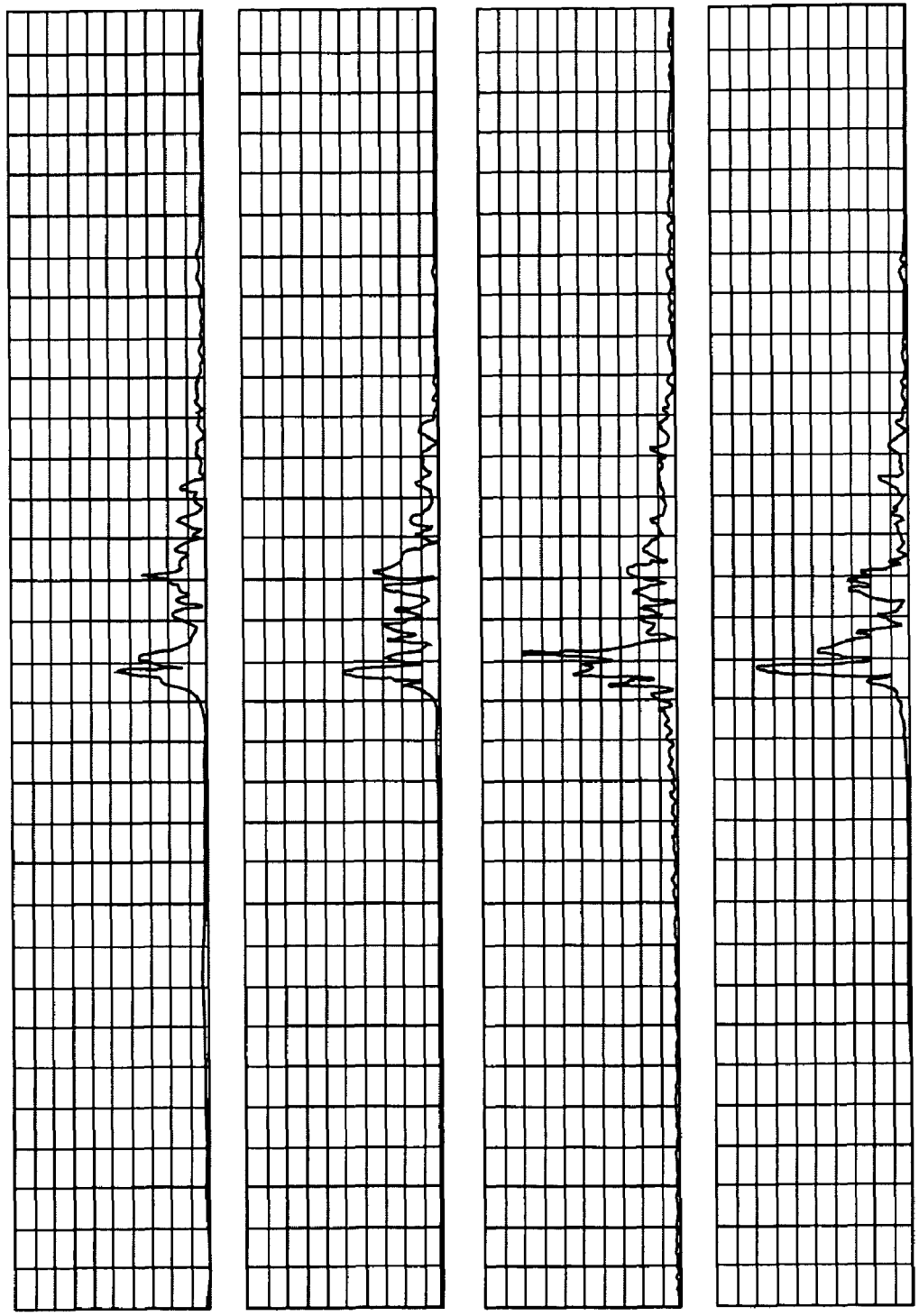
FIG. 7 shows measured channel impulse responses obtained from field test data.

FIG. 7 shows typical values of the impulse response magnitudes computed from field test data recorded while driving through Stockholm, Sweden. Only the magnitudes of the value for each delay bin are shown in FIG. 7, although the values are actually complex. Once the channel impulse response is known, it can be used to compute channel phases and amplitudes for the other subcarrier frequencies lying in between the pilot channels. These values are then used as channel phase references for the decoding of data symbols carried in the data-modulated subcarrier frequencies. As discussed above, noise or other impairments in these phase references may hinder the use of higher order modulations such as 256 QAM and/or the prediction of channel estimates for future time intervals.

Figure 8:
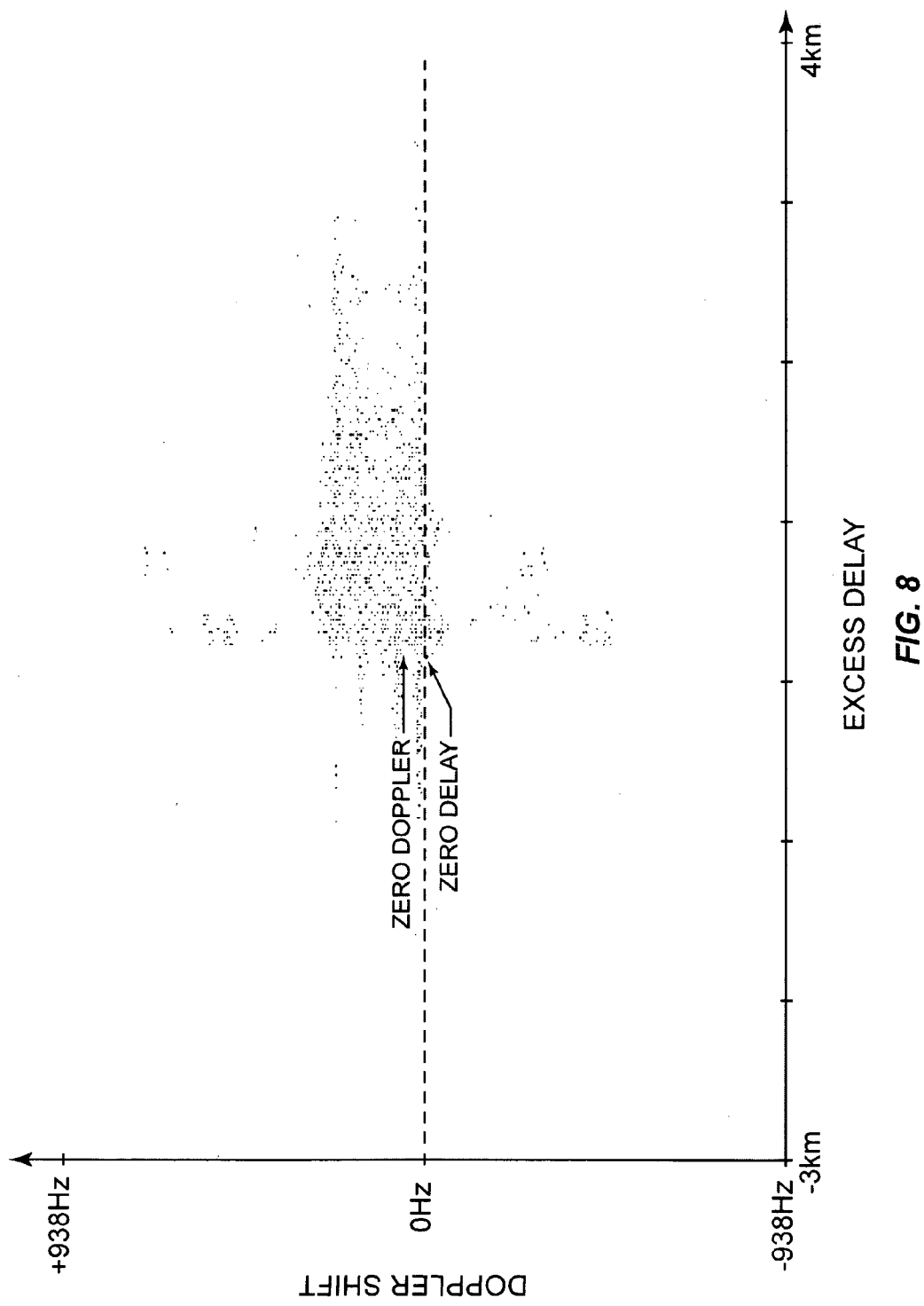
FIG. 8 maps the intensity of signal rays in the Doppler-domain.

Complex delay coefficients from successive time intervals may be stored to form a two dimensional array. Applying an individual time-to-frequency transform to the set of delay coefficients associated with individual delays results in a Doppler spectrum for each delay. The different Doppler spectrums for different delays may be collected into a new 2-D array called the Doppler parameter matrix. Because signal components are now separated by both delay and their relative velocities of the receiver 14 (or transmitter 12) with respect to their scattering objects 10, which is related to the bearing between the receiver 14 and the scattering object 10, the scattering objects 10 are now separated in two spatial dimensions (distance and angle) with the expectation that individual scattering objects 10 will now become resolvable. This indeed appears to be so, as shown in the plot of FIG. 8, which plots intensity of signal rays in the Doppler parameter matrix from a short segment of field test data comprising 40, 324 subcarrier frequencies, 8-symbol, partially pre-smoothed channel estimates collected over a period of 21.32 ms.

However, there exist a number of problems in using prior art frequency-to-time or time-to-frequency domain transforms to carry out the above. One problem is that conventional transform operations rely on the assumption that path delays will fall into equally-spaced time-bins, and likewise that Doppler frequencies will fall into equally-spaced frequency bins. For example, a fundamental assumption in Fourier analysis is that the entire function being transformed is the sum of harmonics of a common fundamental frequency, which means that the function is assumed to be repetitive with a repetition period that is the reciprocal of that common fundamental frequency. Consequently, attempts to use Fourier analysis of a function over samples 1 to N, which includes sample k, to predict the function for future sample N+k will merely return the same value as sample k, which is practically useless.

The algorithm known as Prony's algorithm implements a time-to-frequency transform that may be used to generate the Doppler parameter matrix without the assumption of equally spaced path delays or Doppler frequencies. Prony's algorithm has been traditionally applied to diverse fields such as Linear Predictive Speech Coding, direction finding using antenna arrays, and spectral analysis in Nuclear Magnetic Resonance Spectroscopy. A version in finite field arithmetic, known as the Massey-Berlekamp algorithm, is used for decoding Reed-Solomon error-correcting codes. The Prony algorithm is basically a method of spectral analysis that does not assume the spectrum falls into integrally-related frequency bins.

Unlike other transforms, the Prony algorithm is specifically formulated to spectrally analyze finite time segments of a signal, and therefore, gives precise results. The Prony algorithm decomposes the signal segment into a sum of exponentially decaying, exponentially growing, or static sinusoids which are all described by the expression:

$$Ce^{(\alpha+j\omega)t}, \tag{1}$$

where C is a complex coefficient indicative of phase and amplitude, $\alpha$ is the exponential growth(+) or decay(−) rate factor, and $\omega$ is the angular frequency. Prony expresses a signal S(t) according to:

$$S(t) = \sum_{k=1}^{M} C_k e^{(\alpha_k + j\omega_k)t}. \tag{2}$$

When the signal waveform is recorded at equally spaced intervals of time idt, Equation (2) becomes:

$$S_i = \sum_{k=1}^{M} C_k e^{(\alpha_k + j\omega_k)idt}. \tag{3}$$

Letting $Z_k = e^{(\alpha_k + j\omega_k)dt}$, Equation (3) becomes:

$$S_i = \sum_{k=1}^{M} C_k Z_k^i. \tag{4}$$

Many variations or improvements to Prony's algorithm have been reported, and a good compendium of these techniques may be found in Debasis Kundu's book "Computational Aspects in Statistical Signal Processing", Chapter 14. A modification of Prony's algorithm by Kundu and Mitra adapted to detect undamped sinusoids is reported in the above reference.

The Ser. No. 12/478,473 invention provides an inverse modified Prony algorithm for one exemplary frequency-to-time transform, where the inverse modified Prony algorithm is adapted to accept an input comprising channel values taken at equally spaced sample frequencies along the frequency domain, as in the OFDM test system described above, and to produce an output of delay domain parameters, comprising non-equally spaced delays and their associated complex delay coefficients (phase and amplitude of a delayed signal). The resulting non-equally spaced path delays are not restricted to multiples of any particular time interval, e.g., a 51.44 ns signal sampling period.

The inverse modified Prony algorithm described herein is different than that normally expressed by Equation (2) above. Normally, if one had obtained frequencies $Z_k$ and their associated amplitude/phase coefficients $C_k$ using Prony's analysis method, then the inverse, namely determining the signal at desired times t (other than the given times idt) would involve substituting the determined frequencies and coefficients into Equation (2). Equation (2) therefore represents the conventional inverse of the Prony frequency analysis procedure.

Equation (2) may also be written in term of $Z_k$ as:

$$S(t) = \sum_{k=1}^{M} C_k Z_k^t. \tag{5}$$

By contrast, the frequency-to-time transform described herein, referred to herein as an inverse modified Prony Algorithm, comprises an algorithm for determining the delays $T_i$ and their associated complex delay coefficients $S_{i,q}$ in the equation:

$$C_q(W) = \sum_{i=1}^{M} S_{i,q} e^{j\omega T_i}. \tag{6}$$

Given the channel frequency response $C_{k,q}$ at instant q at N equally spaced sample frequencies $\omega_k = \omega_o + (k-1)\Delta\omega$, k=1, ..., N, Equation (6) becomes:

$$C_{k,q} = \sum_{i=1}^{M} S_{i,q} e^{-j(\omega_o + (k-1)\Delta\omega) T_i}, \tag{7}$$

$$k = 1, \ldots, N.$$

Defining $A_i = S_i e^{-j\omega_o T_i}$ and $Z_i = e^{-j\Delta\omega T_i}$, Equation (7) becomes:

$$C_k = \sum_{i=1}^{M} A_i Z_i^{k-1}, \tag{8}$$

$$k = 1, \ldots, N.$$

Equation (8) does not yet represent the inverse modified Prony Algorithm described herein, but it does represent the inverse of the inverse modified Prony Algorithm. The inverse modified Prony Algorithm is a method of solving (e.g., inverting) Equation (8) for $Z_i$ and $A_{i,q}$ given $C_{k,q}$, and using Equation (9) to determine the path delays $T_i$ once $Z_i$ has been determined.

$$T_i = \frac{j \log(Z_i)}{\Delta\omega} \tag{9}$$

Equation (9) provides purely real values for $T_i$ as long as $Z_i$ is constrained to be purely imaginary. This means $Z_i$ should lie on the unit circle (i.e., magnitude=1) so that its logarithm will have a zero real part.

The above represents the time-frequency inverse of constraining Prony's algorithm to find only undamped sinusoids (e.g., all $\alpha_k = 0$ in Equation (2)). First, try adapting Prony's method to solve Equation (8). This proceeds by letting $T_i$ be the roots of a polynomial P(T) for i=1, ..., M. The coefficients of this polynomial ($p_0, p_1, p_2, \ldots, p_M$) may be found by multiplying all factors $(T-T_1)(T-T_2) \ldots (T-T_M)$, given the $T_i$. Conversely, given the coefficients ($p_0, p_1, p_2, \ldots, p_M$), $T_i$ can be found by root-finding programs, which are well developed, reliable, and fast.

Forming $$p_0 C_{1,q} + p_1 C_{2,q} + p_2 C_{3,q} \ldots + p_M C_{M+1,q} = \sum_{k=0}^{M} p_k C_{k+1,q}, \tag{10}$$

and substituting $C_{k,q}$ from Equation (8) obtains:

$$\sum_{k=0}^{M} p_k \sum_{i=1}^{M} A_{i,q} Z_i^k. \tag{11}$$

By interchanging the order of summation, Equation (11) becomes:

$$\sum_{i=1}^{M} A_{i,q} \sum_{k=0}^{M} p_k Z_i^k = \sum_{i=1}^{M} A_{i,q} P(z_i). \tag{12}$$

However, by definition $z_i$ are the roots of P(z), and therefore, all $P(z_i)$ equal zero. Thus, $p_0 C_{1,q} + p_1 C_{2,q} + p_2 C_{3,q} \ldots + p_M C_{M+1,q} = 0$ represents one equation for the coefficients of P Since this is true for any M+1 successive values of $C_{k,q}$, other equations may be obtained to solve for the coefficients, leading to:

$$\begin{bmatrix} C_1 & C_2 & C_3 & \ldots & C_{M+1} \\ C_2 & C_3 & C_4 & \ldots & C_{M+2} \\ C_3 & C_4 & C_5 & \ldots & C_{M+3} \\ \vdots & \vdots & \vdots & \ddots & \vdots \\ C_{N-M} & C_{N-M+1} & C_{N-M+2} & \ldots & C_N \end{bmatrix} \begin{pmatrix} p_0 \\ p_1 \\ p_2 \\ \vdots \\ p_M \end{pmatrix} = 0. \tag{13}$$

For simplicity, the index q has been dropped from the C-values in the matrix of Equation (13). It shall be understood, however, that all of the C-values in the matrix belong to the same ($q^{th}$) symbol period. Because the polynomial gives the same roots if scaled by an arbitrary factor, Prony proceeded to just let $p_0 = 1$ in Equation (13), moving it to the right hand side of the equation, and then solving for the remaining p values.

In "Mathematical Notes, Note 59," titled "An Improved Prony Algorithm for Exponential Analysis," Harold J. Price contends that the above-described solution according to Prony is non-optimum. Due to noise on the received signal, which corrupts the observed C-values, Equation (13) will not be satisfied exactly but should read:

$$\begin{bmatrix} C_1 & C_2 & C_3 & \ldots & C_{M+1} \\ C_2 & C_3 & C_4 & \ldots & C_{M+2} \\ C_3 & C_4 & C_5 & \ldots & C_{M+3} \\ \vdots & \vdots & \vdots & \ddots & \vdots \\ C_{N-M} & C_{N-M+1} & C_{N-M+2} & \ldots & C_N \end{bmatrix} \begin{pmatrix} p_0 \\ p_1 \\ p_2 \\ \vdots \\ p_M \end{pmatrix} = \varepsilon. \quad (14)$$

Then the desired solution should minimize the length of the error vector $\epsilon$. Because it is the direction of the p vector, and not the length, that determines the roots of the polynomial, the search for the best p using Equation (14) should search only direction space while keeping the length of p unchanged, e.g., setting |p|=1.

The error vector length squared is given by $\epsilon^{\#}\epsilon = p^{\#}[C]^{\#}[C]p$. If p is normalized to unit length by dividing by its own length $\sqrt{p^{\#}p}$, then $$\varepsilon^{\#}\varepsilon = \frac{p^{\#}[C]^{\#}[C]p}{p^{\#}p}. \quad (15)$$

Differentiating the above with respect to p (e.g., calculating the gradient with respect to p) and setting the gradient to zero provides an equation that is satisfied at the maxima and minima of the expression $(p^{\#}p)2[C]^{\#}[C]p-(p^{\#}[C]^{\#}[C]p)2p=0$, leading to:

$$[C]^{\#}[C]p = \frac{(p^{\#}[C]^{\#}[C]p)}{p^{\#}p}p = \lambda p, \quad (16)$$

where $$\lambda = \frac{(p^{\#}[C]^{\#}[C]p)}{p^{\#}p}$$

is a real scalar. Equation (16) represents the definition of an eigenvector of a matrix, namely that the product of the matrix with a vector yields that same vector with just a length scaling by $\lambda$. Thus, the maxima and minima of $\epsilon^{\#}\epsilon$ occur when p is an eigenvector of $[C]^{\#}[C]$, and the associated eigenvalue is the value of $\epsilon^{\#}\epsilon$ at that point. The absolute minimum is thus obtained by choosing p to be the eigenvector associated with the smallest eigenvalue of $[C]^{\#}[C]$.

Equations (13) and (14) can first be simplified by requiring that all roots of P(z) have unit magnitude. This is physically justified because the effect of a delayed ray adding to an undelayed ray is to create a sinusoidal variation of the channel frequency response along the frequency domain, and this sinusoidal curve is of constant amplitude, i.e., undamped. In the above-referenced book to Debasis Kundu, the polynomial P(z) is shown to be a conjugate palindrome in the case where all roots correspond to undamped sinusoids and lie on the unit circle. That is, the polynomial has the form $p_{M-i}=p^*_i$. To show this, consider that a single factor can be written in the form $z-e^{-j\Phi}$, or equivalently as $e^{j\Phi/2}z-e^{-j\Phi/2}=bz-b^*=(b,b^*)$. A single factor, therefore, is evidently a conjugate palindrome. By the method of induction, if a conjugate palindromic polynomial of order N is still palindromic when extended to order N+1 through multiplication by one extra factor, such as $(b,b^*)$, then the product of any number of such factors yields a conjugate palindrome.

Exploiting the conjugate palindromic property of P(z) is best achieved by writing out Equation (14) in terms of its real and imaginary parts, respectively indicated by R and I, as:

$$\left[\begin{array}{ccc|ccc} CR_1 & \ldots & CR_{M/2} & -CI_1 & \ldots & -CI_{M/2} \\ \vdots & \ddots & \vdots & \vdots & \ddots & \vdots \\ CR_{N-M} & \ldots & CR_{N-M/2+1} & -CI_{N-M} & \ldots & -CI_{N-M/2+1} \\ \hline CI_1 & \ldots & CI_{M/2} & CR_1 & \ldots & CR_{M/2} \\ \vdots & \ddots & \vdots & \vdots & \ddots & \vdots \\ CI_{N-M} & \ldots & CI_{N-M/2+1} & CR_{N-M} & \ldots & CR_{N-M/2+1} \\ \hline CR_{M+1} & \ldots & CR_{M/2+1} & CI_{M+1} & \ldots & CI_{M/2+1} \\ \vdots & \ddots & \vdots & \vdots & \ddots & \vdots \\ CR_N & \ldots & CR_{N-M/2+2} & CI_N & \ldots & CI_{N-M/2+2} \\ \hline CI_{M+1} & \ldots & CI_{M/2+1} & -CR_{M+1} & \ldots & -CR_{M/2+1} \\ \vdots & \ddots & \vdots & \vdots & \ddots & \vdots \\ CI_N & \ldots & CI_{N-M/2+2} & -CR_N & \ldots & -CR_{N-M/2+2} \end{array}\right] \begin{pmatrix} PR_0 \\ \vdots \\ PR_{M/2} \\ PI_0 \\ \vdots \\ PI_{M/2} \end{pmatrix} = \varepsilon. \quad (17)$$

Equation (17) has the above form if M is even. When M is odd, there is a slight modification due to the center coefficient of the conjugate palindromic polynomial being real. Equation (17) has twice as many equations in the same number of variables, as before, but all quantities are real. Calling the matrix in Equation (17) Q, and denoting by q the vector of p-values arranged as in Equation (17), the error $\epsilon$ is now minimized when q is the eigenvector of $Q^{\#}Q$ associated with the smallest eigenvalue. Thus, the inverse modified Prony Algorithm described herein reduces to finding the eigenvectors of a real matrix, which, because of its block skew-symmetry and the fact that the blocks have the Hankel structure, may admit a more efficient solution than in the case of a matrix with no structure. If desired, Equation (17) may be rewritten by reverse-ordering $PR_0 \ldots PR_{M/2}$ and $PI_0 \ldots PI_{M/2}$, which makes the four partitions of each matrix Toeplitz instead of Hankel.

Once the eigenvector q is found, the conjugate palindromic polynomial P(Z) can be constructed and its roots $Z_i$ found. Then the delays $T_i$ are found using Equation (9). The amplitude/phase coefficients $A_i$ in Equation (8) then have to be found. Equation (8) can be written:

$$\begin{pmatrix} C_1 \\ C_2 \\ C_3 \\ \vdots \\ C_N \end{pmatrix} = \begin{bmatrix} 1 & 1 & 1 & \ldots & 1 \\ Z_1 & Z_2 & Z_3 & \ldots & Z_M \\ Z_1^2 & Z_2^2 & Z_3^2 & \ldots & Z_M^2 \\ \vdots & \vdots & \vdots & \ddots & \vdots \\ Z_1^{N-1} & Z_2^{N-1} & Z_3^{N-1} & \ldots & Z_M^{N-1} \end{bmatrix} \begin{pmatrix} A_1 \\ A_2 \\ A_3 \\ \vdots \\ A_M \end{pmatrix}, \quad (18)$$

which represents the equation for best-fitting a polynomial with M coefficients A to a set of N+1 data points C. Denoting the matrix in Equation (18) by Z, the solution is given by:

$$A = [Z^\# Z]^{-1} Z^\# C. \quad (19)$$

Equation (19) is solved for each OFDM symbol period (or every few symbol periods if the values $C_k$ were the average over a number of successive symbol periods) to give the amplitude/phase coefficients of signals with the determined delays for each symbol period.

Because it is desired to further analyze the phase and amplitude values for each path delay along successive time periods, e.g., along successive OFDM symbol periods, we impose the additional constraint that the inverse modified Prony Algorithm shall produce the same path delay estimates for each time period, at least for a total evaluation period over which the delays can be assumed to change by negligible amounts. For example, a change in delay of 5 ns may occur due to a movement of 5 feet by the transmitter 12 or receiver 14, which movement would occur over the relatively long time interval of 56.8 ms at 60 mph. Despite the requirement that the determined path delays shall be the same over the evaluation period, the inverse modified Prony algorithm still allows the amplitudes and phases of the signal for each delay value to be determined independently for each successive time interval within the evaluation period. Therefore, we want to find P(z) according to Equations (13), (14), and (17) by including all of the pilot symbol amplitude/phase values $C_k$ for all OFDM symbols in the evaluation period, the resulting path delays being those path delays that best explain the signal in all of the OFDM symbols. This is done by adding blocks vertically to the matrices of Equations (13), (14), and (17) for each symbol period. Denoting the matrix in Equation (17) by Q1 for symbol period 1, Q2 for symbol period 2, etc., the solution q that we seek is the eigenvector associated with the smallest eigenvalue of:

$$\begin{bmatrix} Q1 \\ Q2 \\ Q3 \\ \vdots \\ QL \end{bmatrix}^\# \begin{bmatrix} Q1 \\ Q2 \\ Q3 \\ \vdots \\ QL \end{bmatrix} = [Q1^\# \ Q2^\# \ Q3^\# \ \ldots \ QL^\#] \begin{bmatrix} Q1 \\ Q2 \\ Q3 \\ \vdots \\ QL \end{bmatrix} \quad (20)$$

$$= [Q1^\# Q1 \ Q2^\# Q2 \ Q3^\# Q3 \ \ldots \ QL^\# QL],$$

which will then yield the delay values which best fit all L successive symbol periods. Equation (19) may then be used with the common Z-roots but with their individual C-values to determine the amplitude/phase coefficients A separately for each symbol period.

After determining delays $T_i$ for L successive OFDM symbols and their associated amplitude/phase coefficients $A_{i,q}$, the values of the original amplitude/phase values $S_{i,q}$ may be computed according to:

$$S_{i,q} = A_{i,q} e^{j W_o T_i} \quad (21)$$

for each OFDM symbol period q=1, . . . L, obtaining the two-dimensional delay/time array $S_{i,q}$. By performing an analysis of each delay along the time dimension q=1, . . . , L, the Doppler parameters may be obtained. This is what is shown in FIG. 8. It is undesirable to constrain the Doppler frequencies to discrete bins. Thus, an application of Prony's frequency analysis procedure provides a preferred method of Doppler analysis. Further modifications to both the inverse modified Prony Algorithm for estimating the delay profile and the Prony Algorithm for estimating the Doppler spectrum are possible. For example, the paper "Exact Maximum Likelihood Parameters Estimation of Superimposed Exponential Signals in Noise" (Bresler and Macovksi, IEEE transactions on Acoustics and Signal Processing (1986), vol. 34, p 1081-1089, develops an algorithm called Iterative Quadratic Maximum Likelihood Estimation (IQML). This is derived from the Prony algorithm by noting that the determination of the polynomial P(z) first by solving Equation (14) for the least square error $\epsilon^\# \epsilon$, followed by the determination of the optimum coefficients A using Equation (19), does not guarantee that a different choice of polynomial coefficients could not have produced a lower residual least square error when using the solution of Equation (19) in Equation (18). To rectify this, following Bresler and Macovski, if the solution A from Equation (19) is used in Equation (8), the least square error obtained is given by $C^\#[1-Z(Z^\# Z)^{-1} Z^\#]C$. Now, defining a band matrix G having size N×(N–M) as:

$$G = \begin{bmatrix} p_0 & 0 & 0 & \ldots & \ldots & \ldots & 0 & 0 \\ p_1 & p_0 & 0 & \ldots & \ldots & \ldots & 0 & 0 \\ p_2 & p_1 & p_0 & \ldots & \ldots & \ldots & 0 & 0 \\ p_3 & p_2 & p_1 & & & & p_0 & 0 \\ \vdots & p_3 & p_2 & \ddots & & & p_1 & p_0 \\ p_M & \vdots & p_3 & & & & p_2 & p_1 \\ 0 & p_M & \vdots & & \ddots & & p_3 & p_2 \\ \vdots & 0 & p_M & & & & \vdots & p_3 \\ \vdots & \vdots & \vdots & & & & p_M & \vdots \\ 0 & 0 & 0 & \ldots & \ldots & \ldots & 0 & p_M \end{bmatrix}, \quad (22)$$

it can be shown that $[1-Z(Z^\# Z)^{-1} Z^\#] = G(G^\# G)^{-1} G^\#$. Furthermore, $C^\# G$ may be replaced by $g^\# [C]^\#$, where [C] comprises an (N–M)×(M+1) matrix given by:

$$[C] = \begin{bmatrix} C_1 & C_2 & C_3 & \ldots & C_{M+1} \\ C_2 & C_3 & C_4 & & C_{M+2} \\ C_3 & C_4 & C_5 & & C_{M+3} \\ \vdots & \vdots & \vdots & \ddots & \\ C_{N-M} & \ldots & \ldots & & C_N \end{bmatrix}, \quad (23)$$

which is the same matrix as in Equation (13), and where $g^\# = (p_0, p_1, p_2, \ldots, p_M)$. As a result, $C^\#[1-Z(Z^\# Z)^{-1} Z^\#]C = g^\# [C]^\# (G^\# G)^{-1} [C] g$. Minimizing this expression means that g should be chosen to be the eigenvector associated with the smallest eigenvalue of $[C]^\#(G^\#G)^{-1}[C]$, as opposed to $[C]^\#[C]$ in the above-mentioned improvement to Prony's algorithm proposed in the Howard J. Price reference.

Because G depends on g, the procedure is to find an initial approximation for g using, for example, Prony's method or Price's method, which is the equivalent to initializing $G^\#G$ to 1, and then using that value of g to calculate G, followed by iteration. It is also desirable to restrict P, and therefore, g, to being conjugate palindromes, e.g., $$g=(p_0,p_1,p_2,\ldots p_{M/2},p^*_{M/2},\ldots,p^*_2,p^*_1,p_0), \quad (24)$$

if M is even and $$g=(p_0,p_1,p_2,\ldots p_{(M-1)/2},p_{M/2},p^*_{(M-1)/2},\ldots p^*_2,p^*_1, p_0). \quad (25)$$

if M is odd, where the center coefficient $P_{M/2}$ is real. Thus, when M is odd, Equation (17) will have one more value of PR to find than values of PI.

Once the matrix $[C]^\#(G^\#G)^{-1}[C]$ is found, it is partitioned as was the matrix [C] in Equation (17) in order to solve for the real and imaginary parts of the palindromic polynomial coefficients, and then iterated. Furthermore, it is desired that the same delay profile should hold for an evaluation period of L successive OFDM symbol periods, similar to Equation (20). Namely, letting QL equal the matrix [C] obtained from symbol period L, then the expression from Equation (20) should be used to obtain the starting value of g as the eigenvector associated with its smallest eigenvalue. Then g should be successively refined to be the eigenvector associated with the smallest eigenvalue of:

$$\sum_{q=1}^{L} Q_q^\#(G^\#G)^{-1}Q_q. \quad (26)$$

At each iteration, the above matrix should be partitioned as was the matrix [C] in Equation (17) in order to solve for the real and imaginary parts of the conjugate palindrome eigenvector g. Then G is recalculated for the next iteration. This constitutes the preferred version of the inverse modified Prony algorithm of the Ser. No. 12/478,473 invention, which is used to determine a delay profile of non-equally spaced path delays consistent across an evaluation period of L OFDM symbol periods.

Figure 9:
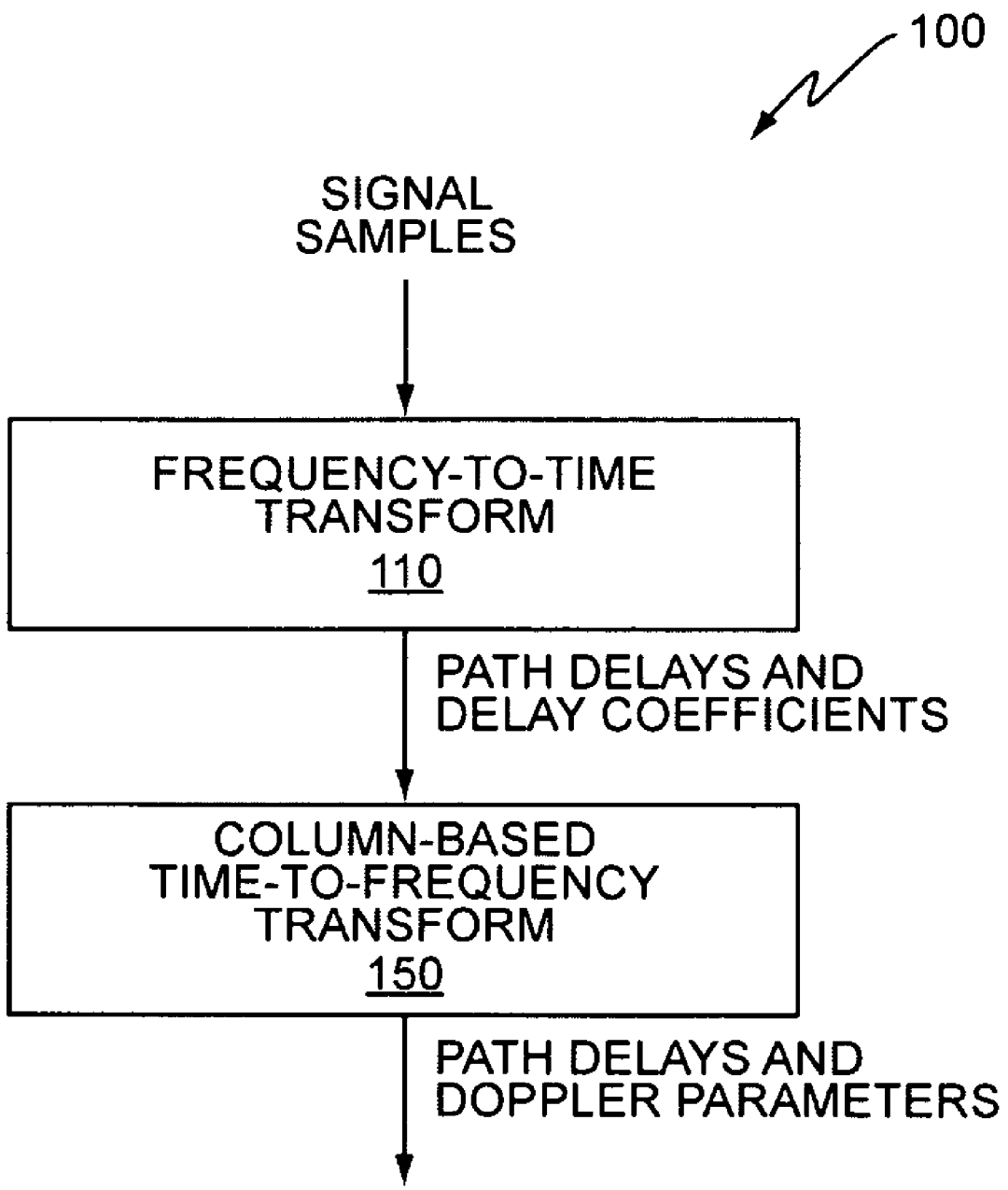
FIG. 9 shows an exemplary method for determining path delays and the corresponding Doppler parameters according to the present invention.

FIG. 9 provides a process 100 for determining path delays and Doppler parameters according to one exemplary embodiment of the Ser. No. 12/478,473 invention. Broadly, process 100 includes applying a frequency-to-time transform to a plurality of received signal samples corresponding to a plurality of frequencies (e.g., OFDM signal samples in an OFDM symbol) to determine a set of non-equally spaced path delays and a set of associated complex delay coefficients (block 110). Each of the non-equally spaced path delays and its associated complex delay coefficient correspond to one or more scattering objects of the wireless communication channel. The complex delay coefficients and path delays are determined for multiple OFDM symbols in an evaluation period to provide a matrix of complex delay coefficients. The complex delay coefficients in a given column of the matrix correspond to a given path delay in the set of non-equally spaced path delays, and the complex delay coefficients in a given row correspond to a given OFDM symbol in the evaluation period.

Subsequently, process 100 applies a time-to-frequency transform to the complex delay coefficients in a column of the delay coefficient matrix to determine a set of Doppler parameters for that path delay (block 150). The Doppler parameters comprise a plurality of non-equally spaced Doppler frequencies and their corresponding complex scattering coefficients, where each Doppler frequency/complex scattering coefficient pair corresponds to a scattering object. The sets of Doppler parameters are collected into a matrix of Doppler parameters, where a given column of the Doppler parameter matrix corresponds to a given path delay in the set of non-equally spaced path delays.

Figure 10A:
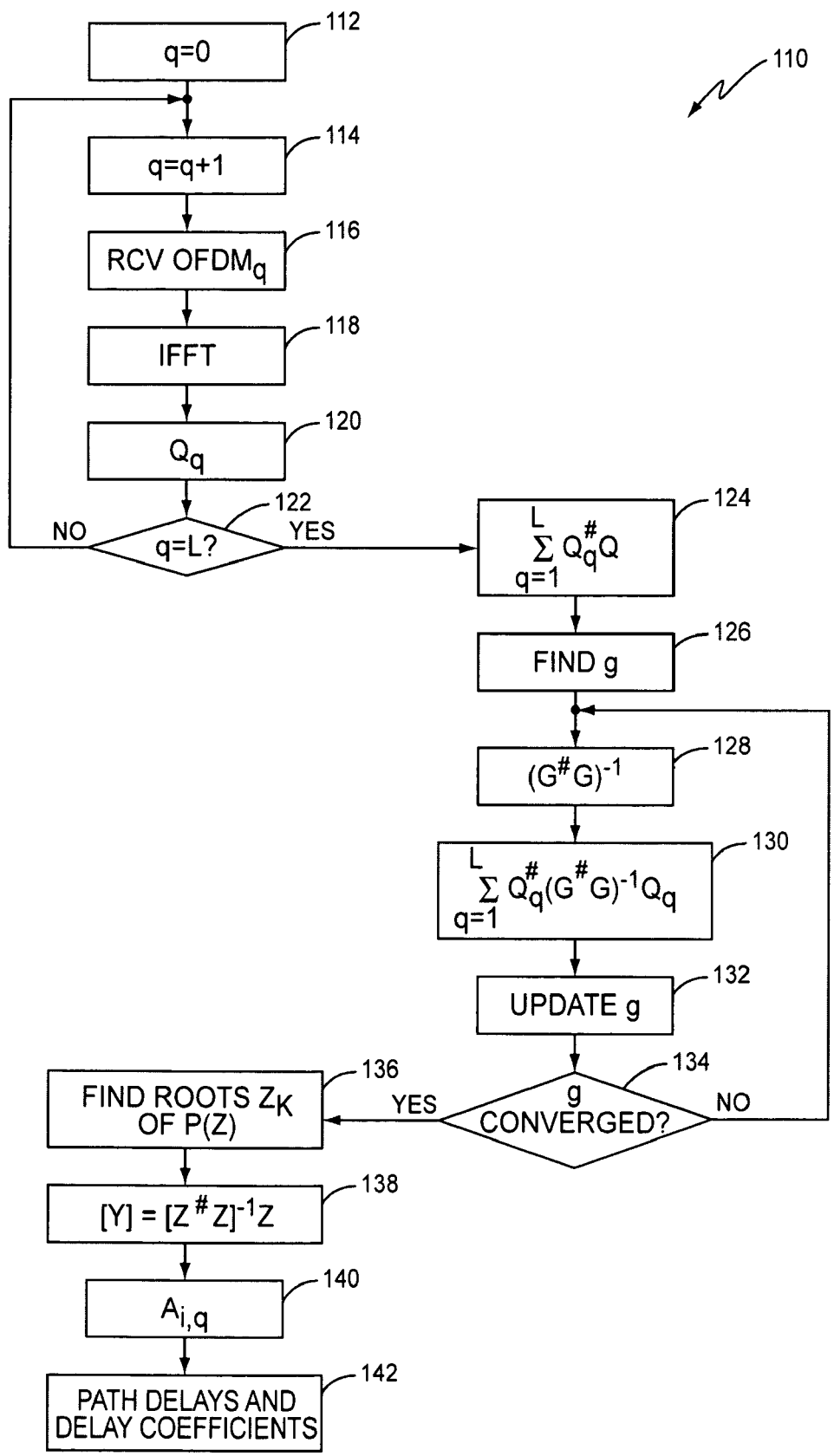
FIGS. 10A and 10B show details for implementing the transform methods of FIG. 7.
Figure 10B:
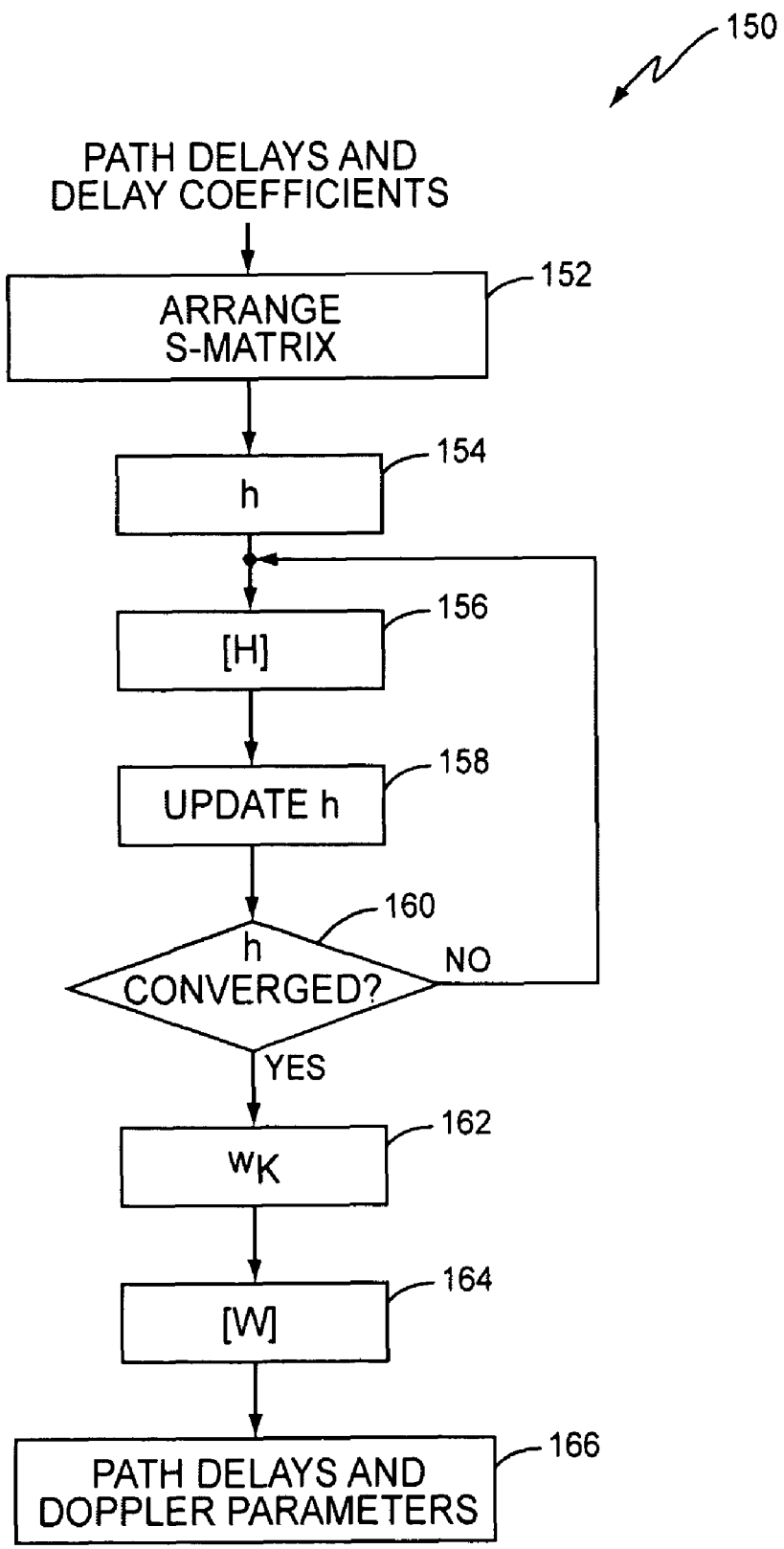

FIGS. 10A and 10B show details for implementing the frequency-to-time transform (block 110) and the time-to-frequency transform (block 150), respectively, according to one exemplary embodiment. In the embodiment of FIG. 10A, the frequency-to-time transform comprises the inverse modified Prony algorithm discussed above. In the embodiment of FIG. 10B, the time-to-frequency transform comprises the Prony algorithm discussed above. It will be appreciated, however, that the present invention is not limited to the Prony algorithms discussed herein. Instead, any transforms that determine the actual time and frequency data without restricting the time and frequency data to equally spaced and predefined bins may be used.

FIG. 10A shows the inverse modified Prony process 110 of the Ser. No. 12/478,473 invention. Before the process begins, the channel processor. 38 initializes a counter (block 112) to track the OFDM symbols of the evaluation period. The channel processor 38 then increments the counter (block 114), receives OFDM symbol q (block 116), and processes the OFDM symbol using Fourier analysis to determine complex amplitude and phase coefficients $C_{k,q}$ for the k-1, ..., N pilot symbols in the symbol period (block 118). Channel processor 38 arranges the N C-values for symbol period q as per the matrix of Equation (14) to obtain the matrix $Q_q$ (block 120). The channel processor then repeats the process of blocks 114-120 until q=L (block 122).

After $Q_q$ has been formed for the L OFDM symbols of the evaluation period, the channel processor 38 forms the matrix sum $$\sum_{q=1}^{L} Q_q^\# Q_q,$$

and partitions the result as in Equation (17) into the sum of Toeplitz+Hankel matrices (block 124). Subsequently, the channel processor 38 finds the initial values of the conjugate palindromic polynomial coefficients g as the eigenvector of the Toeplitz+Hankel matrix partitioning associated with the smallest eigenvalue (block 126), uses g to form the matrix G, and computes $(G^\#G)^{-1}$ (block 128). Channel processor 38 then forms the matrix sum $$\sum_{q=1}^{L} Q_q^\#(G^\#G)^{-1}Q_q,$$

and partitions the result as in Equation (17) (block 130). The expression $Q^\#(G^\#G)^{-1}Q$ represents a noise whitened channel frequency response, and the expression $$\sum_{q=1}^{L} Q_q^\#(G^\#G)^{-1}Q_q$$

represents a cumulative noise whitened channel frequency response. It is possible to evaluate the matrix expressions in many different ways. For example, using FFT techniques in multiplication with Toeplitz matrices, and evaluating matrix-vector expressions in different orders can give rise to intermediate quantities that are matrices in some cases and vectors in others. In all cases, however, the final result embodies the entities $Q^{\#}(G^{\#}G)^{-1}Q$, which may be called "noise whitened channel frequency response autocorrelation matrices." The present invention uses the abbreviated term "noise whitened channel frequency responses" as a general name for intermediate entities that arise in computing matrix or vector combinations of he channel frequency response values, or the matrix of channel frequency response values Q, and the polynomial coefficients g, or the matrix of polynomial coefficients G. After finding improved values of the conjugate palindromic polynomial coefficients g as the eigenvector of the partitioned matrix formed for block 130 associated with the smallest eigenvalue (block 132), the channel processor 38 repeats blocks 126-132 until a converged value of g is obtained (block 134).

The iterative procedure described by blocks 126-134 has a new, unique, and desirable property. Namely, this iterative procedure determines a set of path delays, common to the L OFDM symbol periods, that explain the L observed frequency responses with minimum total least square error, given that the amplitude/phase coefficients for each delay will be determined separately for each OFDM symbol period. This is due to the fact that $g^{\#}Q_1^{\#}(G^{\#}G)^{-1}Q_1 g$ is the square error for OFDM period q=1 when the path delays implied by g are used, after choosing the optimum amplitude/phase coefficients for period q=1. Likewise, $g^{\#}Q_2^{\#}(G^{\#}G)^{-1}Q_2 g$ is the square error for OFDM period q=2 when the path delays implied by g are used, after choosing the optimum amplitude/phase coefficients for period q=2, and so forth. Thus, $$\sum_{q=1}^{L} g^{\#} Q_q^{\#} (G^{\#}G)^{-1} Q_q g$$

is the square error summed over all L symbol periods when the path delays implied by g are used, given that the amplitude/phase coefficients associated with each delay have been optimized separately for each symbol period. Taking out g as a common factor gives $$g^{\#}\left[\sum_{q=1}^{L} Q_q^{\#}(G^{\#}G)^{-1} Q_q\right] g.$$

Hence finding g to be the eigenvector associated with the smallest eigenvalue of the cumulative noise whitened channel frequency responses, as described by blocks 130-134 gives the solution with the desirable properties.

Returning back to the inverse modified Prony process 110, the channel processor 38 finds the roots $z_k$ of the conjugate palindromic polynomial P(z) whose coefficients are given by the converged value of g from block 134 (block 136). The channel processor 38 arranges the powers of the roots $z_k$ to form the matrix [Z] of Equation (18), and hence computes $[Y]=[Z^{\#}Z]^{-1}Z$ (block 138). Channel processor 38 uses the matrix [Y] computed for block 138 to find N coefficients $A_{i,q}$ for symbol period q from the corresponding coefficients $C_{k,q}$ obtained for block 118 for symbol period q, using Equation (19) (block 140). Namely, $A_{i,q}=[Y]C_{i,q}$, where ";" corresponds to the MATLAB notation and indicates arranging $C_{k,q}$ values for all k=1, . . . , N to form a vector of size N×1. Lastly, the channel processor 38 converts the coefficient vector values $A_{i,q}$ into corresponding complex delay coefficient values $S_{i,q}$ by using Equation (21) (block 142). Note: if the pilot symbols are not in the same sub-carrier frequency slots in each OFDM symbol period, but are displaced in a way that can be accounted for by using a different base frequency $\omega_o$ for each OFDM symbol, then the different $\omega_o$ values for each of the q symbol periods should be used for Equation (21) in this step.

Blocks 112-142 of FIG. 10A detail the inverse modified Prony algorithm, which provides an improved method of finding path delays and the associated complex delay coefficients that explain the observed channel frequency responses for one or more OFDM symbol periods. Further improvements are possible by performing a Doppler frequency analysis of the complex delay coefficients for each path delay over many symbol periods, using a second transform, namely a time-to-frequency transform such as provided by Prony's algorithm.

FIG. 10B proves details for the exemplary Prony process 150. Broadly, the channel processor 38 applies the Prony algorithm to the L complex delay coefficients $S_{i,q}$ corresponding to one path delay. More particularly, channel processor 38 arranges the L, S-values for path delay i into a matrix (block 152), as shown by Equation (27).

$$[S] = \begin{bmatrix} S_{i,1} & S_{i,2} & \ldots & S_{i,m+1} \\ S_{i,2} & S_{i,3} & \ldots & S_{i,m+2} \\ \vdots & & \ddots & \vdots \\ S_{i,L-m} & \ldots & \ldots & S_{i,L} \end{bmatrix} \quad (27)$$

The channel processor 38 then finds the eigenvector h associated with the smallest eigenvalue of $[S]^{\#}[S]$ (block 154), constructs an L×L matrix [H] by using h in place of g in Equation (22) (block 156), and finds an improved version of h as the eigenvector associated with the smallest eigenvalue of $[S]^{\#}[H^{\#}H]^{-1}[S]$ (block 158). The channel processor 38 repeats blocks 156-158 until h converges (block 160). Subsequently, the channel processor 38 finds the roots $w_k$ for k=1, . . . , m of the polynomial with coefficients of the converged h (block 162), and forms the L×m matrix [W] by using the roots $w_k$ in place of $z_k$ in Equation (18), and hence computes $[X]=[W^{\#}W]^{-1}W$ (block 164). Lastly, the channel processor 38 finds the m Doppler coefficients $D_i=(d1, d2, d3, \ldots, dm)^{\#}$ for path delay i from $D_i=[X]S_{i,:}$, where ";" means the values for the q=1, . . . , L symbol periods are stacked vertically to form a 1×L vector (block 166).

There are many mathematical devices available to reduce the computational effort needed for performing the transforms of FIGS. 10A and 10B. For example, in block 158 the matrix $[H^{\#}H]$ is Hermitian-symmetric Toeplitz, having only 2(L−m)−1 distinct element values, which represent the autocorrelation function of h* with h. The autocorrelation may be rapidly calculated by padding out h with zeros and using an FFT, according to known theory. Also, the inversion of the Hermitian-symmetric Toeplitz matrix $[H^{\#}H]$ can be carried out in $O(N^2)$ operations using Trench's algorithm. Furthermore, its inverse has to multiply another Toeplitz/Hankel matrix S, whose rows are shifts of each other. This multiplication may also be performed using fewer operations with the help of an FFT, as is well known, and by using the Gohberg-Semencul form of the inverse. The Fourier Transform of the Toeplitz generating sequence for S may be saved and used again when the result is pre-multiplied by $S^{\#}$.

At the conclusion of block 166, we have m Doppler parameters for each of M path delays, forming a two-dimensional m×M array, which is the Doppler-delay diagram of FIG. 8. Doppler-delay diagrams have been obtained from cellular telephone signals before, as reported in "Estimation of scatterer locations from urban array channel measurements at 1800 MHz", Henrik Asplundh and Jan-Erik Berg, conference proceedings of Radio Vetenskap och Kommunikation, (RVK99), pp. 136-140, Karlskrona, Sweden June 1999. These diagrams were obtained using more conventional transform operations. The Delay-Doppler analysis using Prony frequency analysis and the inverse modified Prony Algorithm described herein to compute a delay profile common to several successive OFDM symbols, is expected to yield superior results to those previously obtained. Because of the increased accuracy, the path delays and Doppler parameters obtained by the Ser. No. 12/478,473 invention may be used to determine channel estimates having the requisite accuracy to process higher order modulation (e.g., 256 QAM) signals and/or to accurately predict future channel estimates.

An objective of determining more accurate delay-Doppler analysis is to enable more precise channel estimation for decoding data. Having obtained the more accurate delay-Doppler profile, it is now filtered by one or other methods to reduce or eliminate noise. For example, elements corresponding to impossibly high Doppler values can be set to zero. Likewise, impossible delays, such as negative delays, may be eliminated, as may delays of unlikely high values. Also, some number of spectral coefficients may be selected based on predetermined criteria. For example, the N largest spectral coefficients may be selected, or a threshold may be used to select the spectral coefficients.

In still another embodiment, a Minimum Mean Square Error (MMSE) procedure may be applied to the Doppler parameter matrix. A simplified explanation of MMSE is as follows. A noise level in the Delay-Doppler diagram can be estimated either by reprocessing recently decoded data to determine the noise level on data symbols, or by looking at the values eliminated on the grounds of impossible or unlikely Doppler and delay. In the remaining values, it is not known whether a value of the same order as the RMS value of the estimated noise is a true scatterer or noise. Suppose the value is d. Then using a value αd in place of d when using the delay-Doppler profile to predict a received symbol value will create an expected signal estimation error squared of $(1-\alpha)^2|d|^2$ times the signal power S, while the noise power contribution will be reduced to $\alpha^2$ times the noise power N. The total error is thus $(1-\alpha)^2|d|^2 S^2 + \alpha^2 N$. Differentiating with respect to α and equating to zero yields the value of α giving the least square error as:

$$\alpha = \frac{|d|^2}{|d|^2 + N/S}, \quad (28)$$

where N/S may be identified as the reciprocal of the signal-to-noise ratio that would be present on a Doppler-delay value of magnitude |d|=1. Thus, it may be concluded that the Doppler delay values should be scaled down in dependence on their signal to noise ratios and their amplitudes, such that smaller values are reduced much more than larger values. This is a "softer" method than just clipping out values below a threshold. Other variations of the MMSE method may be used taking account of the correlation matrices between error sources. When the delay-Doppler coefficients scaled by MMSE are employed to re-compute the channel estimate for any OFDM symbol period and subcarrier frequency, substantial reduction of noise on the channel estimate will be evident.

Having selected or weighted the Doppler-delay coefficients as above, the value of a Delay coefficient at some desired time instant (e.g., past, present or future) is computed by summing terms comprising the Doppler-Delay coefficient rotated in phase by the time difference between the reference time and the desired time instant multiplied by the Doppler frequency. Then to find the channel estimate for any OFDM subcarrier frequency, the sum is computed of terms, each of which is the just-found Delay coefficient for the desired time instant rotated in phase by the product of the subcarrier frequency multiplied by the associated path delay. When the desired time instant is a future instant, as was mentioned before, the use of conventional transforms, i.e., Fourier Transforms, for prediction of a function returns the same value as a past value of the function. This deficiency of the prior art was due to the use of equally-spaced bins for either delays, Doppler frequencies, or both. By using non-equally spaced bins, functions are not assumed to be repetitive, and thus a future prediction does not merely return a past value.

One application of the Ser. No. 12/478,473 invention is thus the reduction of noise on channel estimates to facilitate the use of higher order modulations for increasing data rate. The invention may also be used for other purposes, for example, to predict the frequency response of the channel for some future symbol, or to determine the location of a mobile transmitter by performing the inventive analysis of the signal received from the mobile transmitter at a network station to identify a pattern of scattering objects 10, the pattern then being compared with a previously stored data base of scattering object patterns using a pattern recognition algorithm.

When considering the operation of algorithms such as the above over an extended time period, various modes of operation may be employed. For example, the above methods could be used on a block-by-block basis, e.g., by processing a block of previous OFDM symbol waveform samples jointly with the signal samples for the current OFDM symbol to determine a set of scattering objects 10 pertinent to that block. However, if it is not desired to increase latency in processing the current symbol, then each OFDM symbol would need to be processed along with previous symbols, resulting in previous symbol data being reprocessed multiple times. There is at least one advantage of such a method, namely that older symbols reprocessed with the current symbol waveform samples may now have been error-correction decoded and thus data as well as pilot symbols can be used to estimate the older symbols' frequency responses. Including already-decoded data will also be considered with the continuous tracking algorithms described below.

Improvements to processing efficiency are now sought for the continuous case. Yet another variation of the above Prony algorithms may be called "The Continuous Sequential Inverse Prony Algorithm" (CSIPA). The characteristic of CSIPA is that it operates for each OFDM symbol period without waiting for the collection of a data block. It is analogous to the sequential least squares solution first invented by Gauss, and to the continuous least squares process known as a Kalman filter. The use of a Kalman filter to continuously track scatterer parameters will be shown later.

At least two versions of CSIPA can be envisaged: Moving Window, and Exponential Forgetting. To obtain the CSIP algorithm with exponential forgetting, rewrite Equation (26) to be an infinite sum with exponential de-weighting of older values, as shown in Equation (29).

$$\Lambda_L = \sum_{q=-\infty}^{\infty} \lambda^{(L-q)} Q_q^\# (G^\# G)^{-1} Q_q \quad (29)$$

In the above, λ is a factor less than unity which de-weights older errors by a factor that reduces by λ for each successive symbol period further into the past. The current symbol period (L) is not de-weighted, as the power of λ is zero for q=L.

The matrix G can also be assumed to change only marginally from one symbol period to the next. This is justified because, in the block formulation, G was assumed constant over the block, and delays were assumed not to drift over the block. Which assumption is more accurately representative of reality is therefore moot. Moreover, traditional Prony analysis succeeds even with $(G^\#G)^{-1}$ omitted. Thus, using for each symbol period the value of G indexed with the index q is thus an improvement over the traditional Prony method and close to optimum. We thus obtain:

$$\Lambda_L = \sum_{q=-\infty}^{L} \lambda^{(L-q)} Q_q^\# (G^\# G)^{-1} Q_q, \qquad (30)$$

which immediately leads to:

$$\Lambda_L = \lambda \Lambda_{L-1} + Q_L^\# (G_L^\# G_L)^{-1} Q_L. \qquad (31)$$

The CSIP algorithm over a moving window can be obtained similarly by adding the contribution at one end of the block while subtracting the oldest contribution from the other end, obtaining:

$$\Lambda_L = \Lambda_{L-1} + Q_L^\# (G_L^\# G_L)^{-1} Q_L - Q_{L-m}^\# (G_{L-m}^\# G_{L-m})^{-1} Q_{L-m} \qquad (32)$$

Now since we do not yet have g for period L, we do not have $G_L$. This can either be solved by commencing with the use of $G_{L-1}$ to obtain a first value of $g_L$ and then forming $G_L$ therefrom and iterating, or else a better approximation to an initial $G_L$ can be obtained in the following manner. Assuming that each delay value comprises only one dominant scatterer and therefore only one Doppler shift, note that the delay of that scatterer for period L will be its delay determined for period L−1 minus the distance moved in its direction during one symbol period, divided by the speed of light. The distance moved in units of wavelengths is simply the Doppler frequency times the elapsed time, e.g., $$T_i(L) = T_i(L-1) - \Delta \omega_i \frac{T}{\omega_o}, \qquad (33)$$

where $T_i(L)$ represents the delay of the $i^{th}$ scatterer for OFDM symbol period L, $T_i(L-1)$ represents the delay of the $i^{th}$ scatterer for OFDM symbol period L−1, T represents the ODFM symbol period, $\Delta \omega_i$ represents the Doppler shift of the $i^{th}$ scatterer, and $\omega_o$ represents the transmission frequency. Thus using the Doppler frequency determined for a scatterer, its delay can be accurately updated for one period ahead. Using the updated delays, the polynomial $g_L$ can then be formed by multiplying first order factors corresponding to the updated delays. This value of $g_L$ is used to form $G_L$ to an accuracy sufficient for Equation (31) to yield its smallest eigenvalue/vector $g_L$, which may be further iterated if considered or determined to be beneficial.

Figure 11:
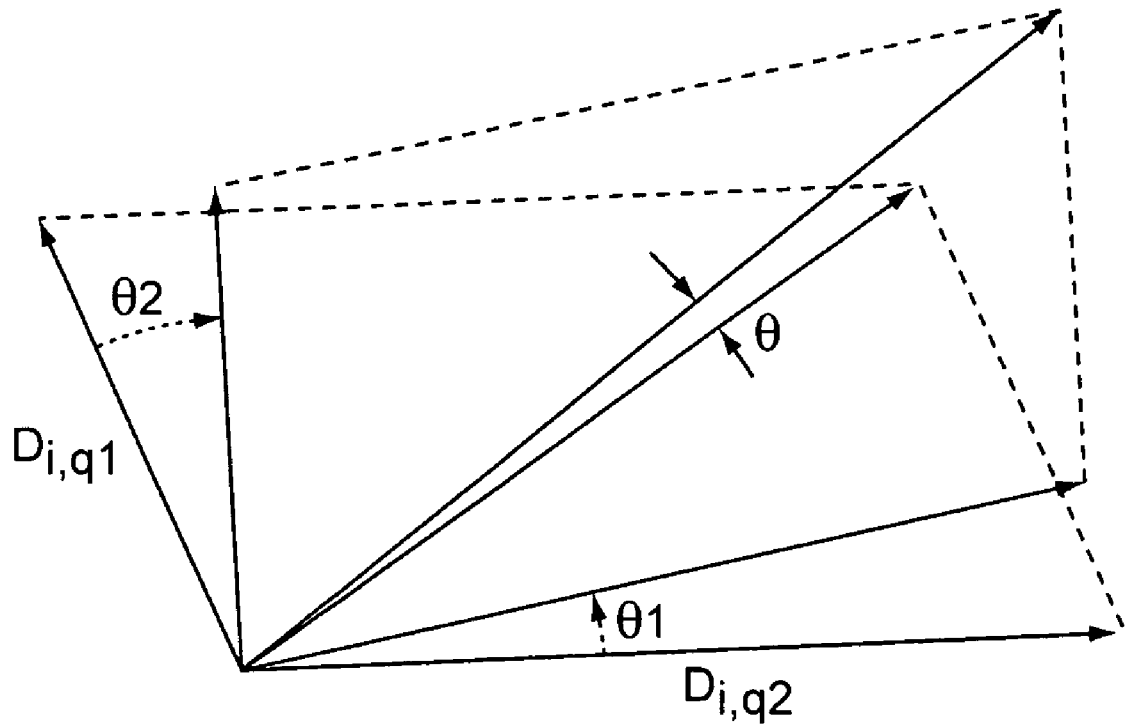
FIG. 11 shows the change in θ due to time delay differences.

If each delay value comprises for example two scattering objects 10 of different Doppler shifts $\Delta \omega_{q1}$, $\Delta \omega_{q2}$, each contributing a complex portion $D_{1,q1}$ and $D_{1,q2}$ to the total delay coefficient $S_{i,L-1}$ for time period L−1, then their contributions for time period L may be updated to $D_{1,q1} e^{j \omega_{i,q1} \Delta T}$ and $D_{1,q2} e^{j \omega_{i,q2} \Delta T}$ for period L, ΔT later. FIG. 11 shows how the resultant vector changes by an amount θ, which is computable by vector arithmetic, and that angular change is then attributed to a change $\Delta T_i$ of the time delay $T_i$, where $\Delta T_i = \theta / \omega$, ω being the center frequency.

Effectively, when a delayed ray is due to the combination of several different scattering objects 10 of different Doppler, the above method gives a method of defining the mean delay change, at least so long as the delays of the scattering objects 10 do not diverge so far as to become considered different delays. The latter may be detected by maintaining the updated delays of individual scattering objects 10 by means of Equation (33) and determining whether the updated delay of any scatterer of one group has become closer to the delays of scattering objects 10 in a second group, at which point its contribution may be removed from the first group and added to the second group using similar vector combination procedures.

Note that past history has been taken into account twice in the above procedure. Firstly, the previously determined delays were updated using their associated Doppler shifts. Then corrected values for the delays were obtained via determining $g_L$ by a procedure in which exponentially de-weighted past history was taken into account again. One or other means of using historical values seems to be redundant in the above procedure. From a numerical perspective, it is of greater interest to eliminate the more complex matrix procedure of computing Equation (31), than to eliminate the trivial procedure of updating previous delays using the Doppler shift, which is also likely to be more accurate, since it is wavelength related.

An alternative procedure is therefore to regard the modified inverse Prony process as merely providing a long term correction or "nudge" of the delays towards their correct positions, while the short term corrections to the delays are provided by integrating their Doppler shifts. This is analogous to a navigation system in which short term position changes are calculated by dead-reckoning using velocity times time, while eliminating drift error from that open-loop process by means of an occasional absolute position fix. Thus in principle, a per-symbol-period modified inverse Prony algorithm may be used to estimate delays (or g-coefficients), and g-coefficients estimated using previous values updated by Doppler are then moved towards the Prony values.

A limitation of per-symbol period inverse modified Prony is that the number of estimated path delays cannot exceed half the number of subcarriers in the OFDM symbol (e.g., about 160 for the 324-subcarrier test system). Thus, a hybrid method of using past history may be to perform CSIPA over a moving rectangular window, using the results as a means of drift-correcting values obtained just before the window that have been updated using integrated Doppler. If delays are updated using integrated Doppler, this takes the place of updating Doppler based on the symbol-to-symbol variation of phase, and an additional means of estimating Doppler from symbol-period to symbol period would then be required. This is best described in the context of using an integrated Doppler approach in the form of a Kalman process to track delays and their derivatives, which may be formally equated with Doppler shifts.

A Kalman tracking process may be constructed by assuming that the channel at frequency ω is explained by a sum of scattered waves from individual scattering objects 10 of strength $S_{i,q}$ at time qT. Each scattered wave is delayed in phase by propagating through a delay $T_i$ which is assumed to change linearly with time due to the mobile station's resolved velocity in its direction, leading to the formula for delay at time qT as:

$$T_{i,q} = T_{i,q-1} + T'_{i,q} \Delta T, \qquad (34)$$

where ΔT is the (OFDM) symbol period. Thus, $$C_q(\omega) = \sum_i S_{i,q} e^{-j\omega(T_{i,o} + qT'_i \Delta T)}, \qquad (35)$$

where the index "i" ranges over all scattering objects 10. Since phase is now explained by delay, and Doppler, which is rate of change of phase, is explained by rate of change of delay, there seems no longer any need for the scatterer parameters $S_{i,q}$ to be complex, and it would seem to be reducible to a real signal strength factor. A reason for retaining complex scatter parameter values however is that the mobile station antenna pattern can be quite distorted, and have a varying phase dependent on the direction of the sightline to the scatterer. Ascribing that phase to slightly different scatterer positions, on the order of millimeters different, is a small inaccuracy, but is avoided by retaining complex scatterer parameters.

Figure 12:
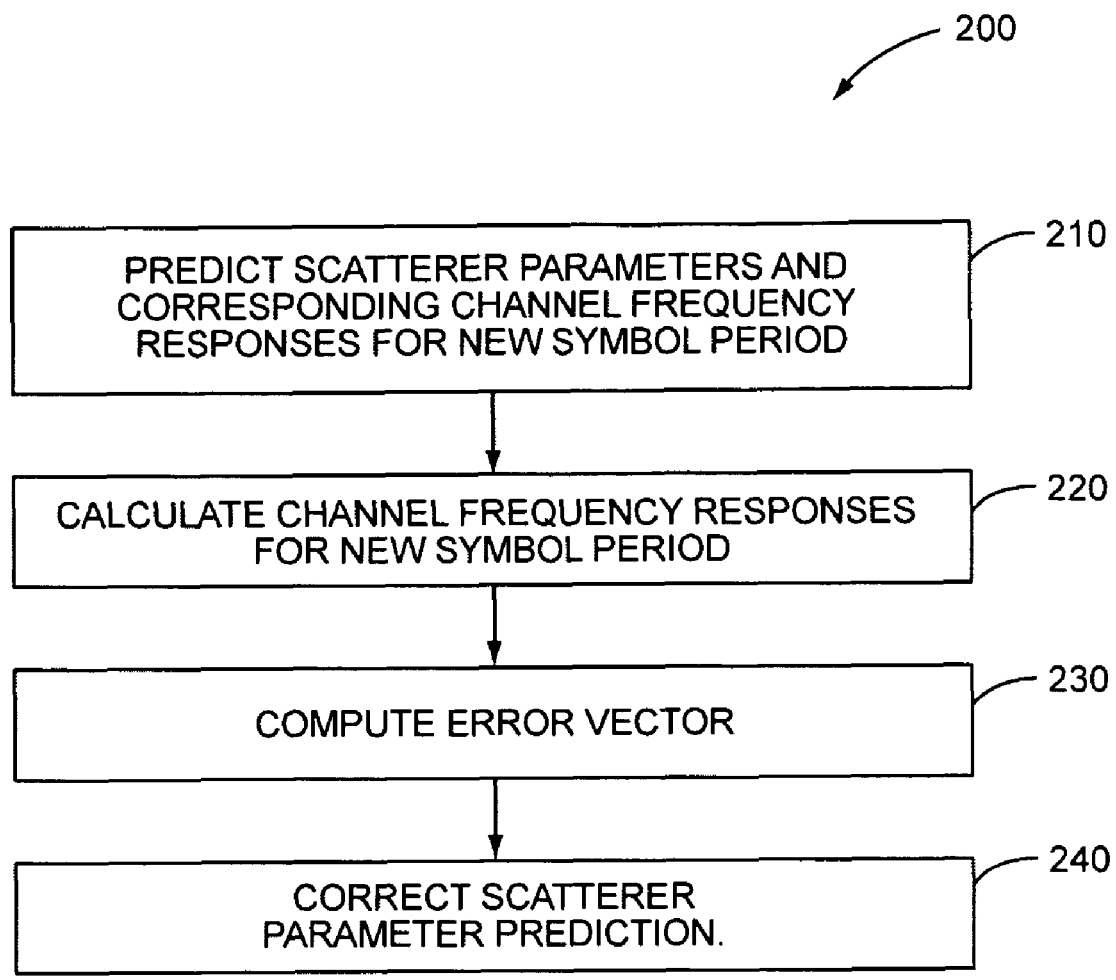
FIG. 12 shows one integrated Doppler process for tracking scatterer parameters according to one exemplary embodiment of the present invention.

A Kalman tracking filter seeks to successively refine estimates of the scatterer parameters based on a channel frequency response vector $C(\omega)$ of channel frequency response observations at different frequencies at the current time q. An exemplary integrated Doppler process 200 corresponding to the operations of a Kalman tracking filter is shown in FIG. 12. The channel processor 38 predicts the scatterer parameters and corresponding channel frequency responses for the new symbol period associated with time q (block 210). For example, the channel processor 38 predicts the scatterer parameters by predicting the values of $S_{i,q}$ and $T_{i,q}$ which can collectively be denoted by a vector U, from the values of U at time q−1. This may be done simply by assuming $S_{i,q}=S_{i,q-1}$, $T'_{i,q}=T'_{i,q-1}$, and $T_{i,q}=T_{i,q-1}+T'_{i,q-1}\Delta T$. It is usually possible to choose a scaling convention for $T'_{i,q}$ such that the factor $\Delta T$ is included, obviating the need for a multiply. Subsequently, the channel processor 38 predicts the next channel frequency response vector $C(\omega)$ for time q using the predictions for $S_{i,q}$ and $T_{i,q}$. Channel processor 38 then calculates an observed channel frequency response vector $C(\omega)$ based on the OFDM symbol received at time q (block 220), and computes an error vector $\epsilon$ between the predicted $C(\omega)$ and the observed $C(\omega)$ (block 230). The channel processor 38 subsequently corrects the scatterer parameter prediction (block 240) in such a way as to reduce the error vector $\epsilon$.

The scatterer parameter prediction of block 210 may be written in matrix form as:

$$\begin{pmatrix} S_{1,q} \\ T_{1,q} \\ T'_{1,q} \\ S_{2,q} \\ T_{2,q} \\ T'_{2,q} \\ \vdots \\ S_{m,q} \\ T_{m,q} \\ T'_{m,q} \end{pmatrix} = \begin{bmatrix} 1 & 0 & 0 & 0 & 0 & 0 & & 0 & 0 & 0 \\ 0 & 1 & \Delta T & 0 & 0 & 0 & \cdots & 0 & 0 & 0 \\ 0 & 0 & 1 & 0 & 0 & 0 & & 0 & 0 & 0 \\ 0 & 0 & 0 & 1 & 0 & 0 & & 0 & 0 & 0 \\ 0 & 0 & 0 & 0 & 1 & \Delta T & \cdots & 0 & 0 & 0 \\ 0 & 0 & 0 & 0 & 0 & 1 & & 0 & 0 & 0 \\ \vdots & & & & \vdots & & \ddots & & \vdots & \\ 0 & 0 & 0 & 0 & 0 & 0 & & 1 & 0 & 0 \\ 0 & 0 & 0 & 0 & 0 & 0 & \cdots & 0 & 1 & \Delta T \\ 0 & 0 & 0 & 0 & 0 & 0 & & 0 & 0 & 1 \end{bmatrix} \begin{pmatrix} S_{1,q-1} \\ T_{1,q-1} \\ T'_{1,q-1} \\ S_{2,q-1} \\ T_{2,q-1} \\ T'_{2,q-1} \\ \vdots \\ S_{m,q-1} \\ T_{m,q-1} \\ T'_{m,q-1} \end{pmatrix} \quad (36)$$

The matrix in Equation (36) is often denoted by $\Phi$. In block 240, correction of the predictions made in block 210 comprises the use of the inverse of the covariance matrix, commonly denoted by P. Since P is also initially unknown, it is also predicted and corrected based on receipt of new observations.

Different means may be used to predict P. For example, P may be predicted using:

$$P_q = \Phi P_{q-1} \Phi^\# + Q, \quad (37)$$

which is appropriate where the parameters S, T, and T' may be subject to random wandering and Q describes their propensity to do so. Alternatively, P may be predicted using:

$$P_q = \lambda^{-1} \Phi P_{q-1} \Phi^\#, \quad (38)$$

which is appropriate for exponential de-weighting of past history, where $\lambda<1$ represents an exponential forgetting factor. In still another example, P may be predicted using:

$$P_q = \Phi P_{q-1} \Phi^\#, \quad (39)$$

which is appropriate in the case of "least squares forever," where all past history is used and no de-weighting is desired.

The correction implemented in block 240 uses derivatives (e.g., the GRADient) of the observation channel frequency response vector with respect to the vector of parameters S and T, which is obtained from Equation (35) and using $T_{i,q}=t_{i,o}+q\Delta t'_i$ as:

$$\frac{dC(\omega)}{dS_{i,q}} = e^{-j\omega T_{i,q}} \quad (40)$$

and $$\frac{dC(\omega)}{dT_{i,q}} = -j\omega S_{i,q} e^{-j\omega T_{i,q}},$$

and the derivative with respect to T' is zero. Hence, $$GRAD(C(\omega)) = \begin{pmatrix} e^{-j\omega T_{1,q}} \\ -j\omega S_{1,q} e^{-j\omega T_{1,q}} \\ 0 \\ e^{-j\omega T_{2,q}} \\ -j\omega S_{2,q} e^{-j\omega T_{2,q}} \\ 0 \\ \vdots \\ e^{-j\omega T_{m,q}} \\ -j\omega S_{m,q} e^{-j\omega T_{m,q}} \\ 0 \end{pmatrix}. \quad (41)$$

When the GRADient vectors for each $\omega$ for which $C(\omega)$ will be observed are stacked side by side, the result is a 3 m×N matrix where N represents the number of scattering objects 10 and m represents the number of frequencies at which C is observed. When, as above, the GRADient is not constant but is a function of the parameters (S and T), the process is known as a "linearized" or "extended" Kalman filter process.

The correction implemented in block 240 comprises updating the vector of parameters denoted by U using:

$$U \leq U - P\text{GRAD}[R + \text{GRAD}^\# P\text{GRAD}]^{-1} \epsilon, \text{ and} \quad (42)$$

$$P \leq P - P\text{GRAD}[R + \text{GRAD}^\# P\text{GRAD}]^{-1} \text{GRAD}^\# P. \quad (43)$$

In the above update step, it is usually possible to choose the scaling of the Q-matrix, which represents the tendency of the tracked parameters to exhibit a random walk, such that the matrix R, which represents covariance of noise on the observation vector, is the unit vector I.

Another variation of the extended Kalman filter may be derived by defining the error between predicted and observed $C(\omega)$ vectors to be the scalar $\epsilon^\#\epsilon$. The new gradient vector would then be $2\epsilon^\#\text{GRAD}(C(\omega))$. The benefit of this formulation is that the matrix inverse $[R+\text{GRAD}^\# P\text{GRAD}]^{-1}$ is avoided, being replaced by division by a scalar $1+\epsilon\text{GRAD}^\# P\text{GRAD}\epsilon$.

The above extended Kalman filter can be used to track the scatterer parameters, e.g., delay, Doppler (rate of change of delay), and signal strength of already identified scattering objects 10, and functions even when the updated delays of different scattering objects 10 move through one another in value. Eventually, a tracked scatterer may become distant and weak, while a previously untracked scatterer gets nearer and stronger. Thus, a procedure intended to operate for long periods of time, e.g., for minutes or hours, should include ways to discard scattering objects 10 that have become insignificant and to detect the appearance of and then track new scattering objects 10.

In one exemplary embodiment, the channel estimator 38 of the present invention may track known scattering objects 10 using the extended Kalman filter described above, subtract out their contributions to the received signal to leave a residual which would be expected to comprise noise and untracked scattering objects 10, and process the residual using the Prony-based algorithms of FIGS. 10A and 10B to identify new scattering objects 10. Periodically, any scattering objects 10 identified by the Prony algorithm would be compared in strength to those being tracked by the Kalman algorithm. The channel estimator 38 replaces a weak, Kalman-tracked scatterer with a Prony-detected scatterer in the event of the latter becoming stronger.

The addition or deletion of a tracked scatterer from the Kalman algorithm occurs through deletion or addition of appropriate rows and columns of the P, Q, and $\Phi$ matrices. For example, if 128 scattering objects 10 are being tracked, and it is desired to discard scattering object number 79, then rows and columns numbered $3\times78+1$, $3\times78+2$, and $3\times78+3$ are deleted from the P, Q, and $\Phi$ matrices. Conversely, if 127 scattering objects 10 are being tracked and it is desired to add a $128^{th}$, then rows and columns 1, 2, and 3 of the Q and $\Phi$ matrices are copied to rows and columns $3\times128+1$, $3\times128+2$ and $3\times128+3$, extending the dimensions by 3. The P-matrix is also extended by three rows and columns from $3\times127$ to $3\times128$ square. The additional rows and columns are initialized to zero everywhere except on the main diagonal. The main diagonal is initialized to values inversely indicative of the confidence in the initial values of the parameters S, T, and T' of the $128^{th}$ scattering object 10. If the values are obtained from Prony analysis of the residual signal mentioned above, and are considered reasonably accurate, the three new diagonal P-elements may be initialized to zero, or to the mean of corresponding P-matrix elements for scattering objects 1-127. It may be appropriate to use the block formulation of the Prony procedures, such that the above-defined signal residuals are collected over a number of OFDM symbol periods and processed en block to detect the appearance of new scattering objects 10. The time over which new scattering objects 10 are expected to appear or disappear is of the order of the time required for the mobile station to move a few meters, which, at 70 mph, would be on the order of 100 ms. Furthermore, in that period of time, older OFDM symbols may have been error-correction decoded, making observations of $C(\omega)$ available not only at the sub-carrier frequencies of pilot symbols, but also at the data symbol frequencies. It may in fact be intelligent to deliberately collect signal residuals over a block period that is aligned with one or more error-correction code blocks, such as a turbo-code block, such that the block Prony procedure is performed using observations of the channel at both pilot and data subcarrier frequencies. Any new scattering objects 10 thereby identified are compared with scattering objects 10 being tracked by the extended Kalman filter, and transferred from the Prony results to the Kalman tracking procedure by addition of new scatterer parameters, with or without deletion of scatterer parameters corresponding to scattering objects 10 that have become weak.

The following shows a procedure for processing a signal received continuously based on a collection of the algorithms disclosed above.

(a) A power-up synchronization phase occurs, in which the receiving station would receive signals from the transmitting station and determine symbol and block boundaries with the aid of pilot symbols and other pre-agreed clues that may be inserted into the transmitted stream.

(b) An initial channel identification phase occurs, in which channel frequency responses (e.g., complex values $C(\omega)$ at one or more sets of equally spaced frequencies ($\omega=\omega_o+k\Delta\omega$) are be determined with the aid of pilot symbols.

(c) Individual scattering objects 10 are resolved using specially adapted versions of the Prony method for both delay and Doppler resolution, as described herein and claimed in the Ser. No. 12/478,473 application.

(d) Scatterer parameters are extracted from the Prony algorithms of step (c) for tracking by an extended Kalman filter adapted to track delay, rate of change of delay and scatterer signal amplitude, which may be real or complex.

(e) Using the tracked scatterer parameters, improved estimates of the channel complex frequency response are provided for the purposes of demodulating data symbols.

(f) Data symbols are collected over error-correction code blocks and error-correction decoding is performed.

(g) Using correctly decoded data symbols and known pilot symbols in combination with said estimates of the channel complex frequency response, the likely received signal is reconstructed and subtracted from the actual received signal to obtain a residual signal.

(h) The residual signal is collected over one or more error-correction coding block periods and reprocessed using same Prony procedure as in step (c) to identify scattering objects 10 other than those being tracked in step (d).

(i) The strengths of the scattering objects 10 identified in step (h) are compared with the strengths of the scattering objects being tracked in step (d). The channel processor 40 transfers the parameters of any scattering objects 10 identified in step (h) that are stronger than the weakest scattering objects 10 being tracked in step (d) to the Kalman tracking procedure. To maintain the same number of scatterer parameters, scatterer parameters due to the weakest scattering objects 10 may be deleted.

Note that the procedure of steps (a)-(i) be preformed using signals other than OFDM signals if they are suitably constructed. For example, a CDMA signal using superimposed pilot codes to permit channel estimation may be processed in the above manner. In the above description of the present invention, a number of algorithms have been disclosed which may be used in various combinations together with other algorithms previously disclosed or already known in the art, in order better to decode data transmitted between a mobile station and a network station. The direction of data transmission is immaterial, the method being suitable for improved decoding of signals transmitted by a mobile station and received by a fixed network station, or vice versa.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless receiver of tracking scatterer parameters used to determine channel estimates for a wireless channel, the method comprising:
  determining a first set of scatterer parameters based on one or more sets of signal samples received during one or more previous time intervals, wherein the first set of scatterer parameters comprises;
    a set of unequally-spaced path delays;
    a corresponding set of unequally-spaced rates of change wherein the rate of change comprises a Doppler frequency; and
    a corresponding set of complex scattering coefficients wherein each scattering coefficient corresponds to a scattering object;
  wherein determining the first set of scatterer parameters further comprises:
    determining a first set of noise whitened channel frequency responses based on the one or more sets of signal samples received during a first evaluation period comprising one or more previous time intervals; and
    determining the first set of scatterer parameters for the first evaluation period based on the first set of noise whitened channel frequency responses, wherein elements of the first set of scatterer parameters comprise a Doppler spectrum for each of unequally spaced path delays, and wherein each Doppler spectrum comprises a plurality of scattering coefficients and associated unequally spaced Doppler frequencies associated with corresponding scattering objects
  receiving signal samples over said wireless channel during a subsequent time interval;
  estimating a channel frequency response for said subsequent time interval wherein estimating the channel frequency response for the subsequent time interval further comprises:
    determining a second set of noise whitened channel frequency responses based on the signal samples received during the subsequent time interval; and
    determining an updated set of noise whitened channel frequency responses based on the first and second sets of noise whitened channel frequency responses; and
  wherein updating one or more scatterer parameters in the first set comprises updating the first set of scatterer parameters based on the updated set of noise whitened channel frequency responses to determine the updated set of scatterer parameters and
  updating one or more of the scatterer parameters in the first set based on the estimated channel frequency response to determine an updated set of scatterer parameters for the subsequent time interval.

2. The method of claim 1 wherein determining the updated set of noise whitened channel frequency responses comprises adding the second set of noise whitened channel frequency responses to the first set of noise whitened channel frequency responses.

3. The method of claim 2 wherein determining the updated set of noise whitened channel frequency responses further comprises subtracting an old set of noise whitened channel frequency responses corresponding to one of the oldest time intervals from the updated set of noise whitened channel frequency responses.

4. The method of claim 1 wherein determining the updated set of noise whitened channel frequency responses comprises:
  scaling the first set of noise whitened channel frequency responses by a predetermined scaling factor less than unity to generate a scaled set of noise whitened channel frequency responses; and
  adding the second set of noise whitened channel frequency responses to the scaled set of noise whitened channel frequency responses.

5. A method implemented by a wireless receiver of tracking scatterer parameters used to determine channel estimates for a wireless channel, the method comprising:
  determining a first set of scatterer parameters based on one or more sets of signal samples received during one or more previous time intervals, wherein the first set of scatterer parameters comprises:
    a set of unequally-spaced path delays,
    a corresponding set of unequally-spaced rates of change, and
    a corresponding set of complex scattering coefficients, and wherein each scattering coefficient corresponds to a scattering object;
  receiving signal samples over said wireless channel during a subsequent time interval;
  estimating a channel frequency response for said subsequent time interval wherein estimating the channel frequency response for the subsequent time interval further comprises:
    determining a predicted set of scatterer parameters for the subsequent time interval based on the first set of scatterer parameters; and
    predicting a set of channel frequency responses for the subsequent time interval based on the predicted set of scatterer parameters;
    determining an observed set of channel frequency responses based on the new signal samples received during the subsequent time interval;
    comparing the predicted set of channel frequency responses with the observed set of channel frequency responses to determine a prediction error; and
    correcting the predicted set of channel frequency responses to reduce the prediction error and
  updating one or more of the scatterer parameters in the first set based on the estimated channel frequency response to determine an updated set of scatterer parameters for the subsequent time interval wherein determining the updated set of scatterer parameters comprises determining the updated set of scatterer parameters based on the corrected set of channel frequency responses; and
  tracking scattering objects within the wireless channel by replacing scatterer parameters corresponding to increasingly distant scattering objects in the first or updated sets of scatterer parameters with scatterer parameters corresponding to increasingly closer scattering objects.

6. The method of claim 5 wherein determining the updated set of scatterer parameters based on the corrected set of channel frequency responses comprises determining the updated set of scatterer parameters using a Kalman tracking process, and wherein tracking the scattering objects comprises using a continuous sequential update process to search for new scattering objects and to replace scatterer parameters corresponding to increasingly distant scattering objects in the first or updated sets of scatterer parameters with scatterer parameters corresponding to the new scattering objects.

7. A wireless receiver configured to track scatterer parameters used to determine channel estimates for a wireless channel, the wireless receiver comprising a channel processor configured to:

determine a first set of scatterer parameters based on one or more sets of signal samples received during one or more previous time intervals, wherein the first set of scatterer parameters comprises:
  a set of unequally-spaced path delays;
  a corresponding set of unequally-spaced rates of change, wherein the rate of change comprises a Doppler frequency; and
  a corresponding set of complex scattering coefficients, and wherein each scattering coefficient corresponds to a scattering object;
estimate a channel frequency response for a subsequent time interval; and
update one or more of the scatterer parameters in the first set based on the estimated channel frequency response to determine an updated set of scatterer parameters for the subsequent time interval
wherein the channel processor is configured to determine the first set of scatterer parameters by:
determining a first set of noise whitened channel frequency responses based on the one or more sets of signal samples received during a first evaluation period comprising one or more previous time intervals; and
determining the first set of scatterer parameters for the first evaluation period based on the first set of noise whitened channel frequency responses, wherein elements of the first set of scatterer parameters comprise a Doppler spectrum for each of the unequally spaced path delays, and wherein each Doppler spectrum comprises a plurality of scattering coefficients and associated unequally spaced Doppler frequencies associated with corresponding scattering objects;
wherein the channel processor is configured to estimate the channel frequency response for the subsequent time interval by:
determining a second set of noise whitened channel frequency responses based on signal samples received during the subsequent time interval; and
determining an updated set of noise whitened channel frequency responses based on the first and second sets of noise whitened channel frequency responses; and
wherein updating one or more scatterer parameters in the first set comprises updating the first set of scatterer parameters based on the updated set of noise whitened channel frequency responses to determine the updated set of scatterer parameters.

8. The wireless receiver of claim 7 wherein the channel processor is configured to determine the updated set of noise whitened channel frequency responses by adding the second set of noise whitened channel frequency responses to the first set of noise whitened channel frequency responses.

9. The wireless receiver of claim 8 wherein the channel processor is further configured to determine the updated set of noise whitened channel frequency responses by subtracting an old set of noise whitened channel frequency responses corresponding to one of the oldest time intervals from the updated set of noise whitened channel frequency responses.

10. The wireless receiver of claim 9 wherein the channel processor is configured to determine the updated set of noise whitened channel frequency responses by:
  scaling the first set of noise whitened channel frequency responses by a predetermined scaling factor less than unity to generate a scaled set of noise whitened channel frequency responses; and
  adding the second set of noise whitened channel frequency responses to the scaled set of noise whitened channel frequency responses.

11. A wireless receiver configured to track scatterer parameters used to determine channel estimates for a wireless channel, the wireless receiver comprising a channel processor configured to:
determine a first set of scatterer parameters based on one or more sets of signal samples received during one or more previous time intervals, wherein the first set of scatterer parameters comprises:
  a set of unequally-spaced path delays;
  a corresponding set of unequally-spaced rates of change; and
  a corresponding set of complex scattering coefficients, and wherein each scattering coefficient corresponds to a scattering object;
estimate a channel frequency response for a subsequent time interval, wherein the channel processor is configured to estimate the channel frequency response for the subsequent time interval by:
  determining a predicted set of scatterer parameters for the subsequent time interval based on the first set of scatterer parameters; and
  predicting a set of channel frequency responses for the subsequent time interval based on the predicted set of scatterer parameters; and
update one or more of the scatterer parameters in the first set based on the estimated channel frequency response to determine an updated set of scatterer parameters for the subsequent time interval, wherein the channel processor is further configured to estimate the channel frequency response for the subsequent time interval by:
  determining an observed set of channel frequency responses based on the new signal samples received during the subsequent time interval;
  comparing the predicted set of channel frequency responses with the observed set of channel frequency responses to determine a prediction error; and
  correcting the predicted set of channel frequency responses to reduce the prediction error wherein the channel processor is configured to determine the updated set of scatterer parameters based on the corrected set of channel frequency responses; and
wherein the channel processor is further configured to track scattering objects within the wireless channel by replacing scatterer parameters corresponding to increasingly distant scattering objects in the first or updated sets of scatterer parameters with scatterer parameters corresponding to increasingly closer scattering objects.

12. The wireless receiver of claim 11 wherein the channel processor is configured to use a Kalman tracking process to determine the updated set of scatterer parameters based on the corrected set of channel frequency responses, and wherein the channel processor is configured to use a continuous sequential update process to search for new scattering objects and to replace scatterer parameters corresponding to increasingly distant scattering objects in the first or updated sets of scatterer parameters with scatterer parameters corresponding to the new scattering objects.

* * * * *

UNITED STATES PATENT AND TRADEMARK OFFICE
CERTIFICATE OF CORRECTION

PATENT NO. : 8,116,710 B2  
APPLICATION NO. : 12/478520  
DATED : February 14, 2012  
INVENTOR(S) : Dent et al.

Page 1 of 1

It is certified that error appears in the above-identified patent and that said Letters Patent is hereby corrected as shown below:

On the Cover Page, item (57), under "ABSTRACT", in Column 2, Line 13, delete "exemplar" and insert -- exemplary --, therefor.

In Column 2, Line 3, delete "exemplar" and insert -- exemplary --, therefor.

In Column 18, Line 10, delete "q=1,... L," and insert -- q=1,..., L, --, therefor.

In Column 19, Line 7, delete "1," and insert -- I, --, therefor.

In Column 19, Line 14, in Equation (25), delete "$\cdots p^*_{2}, p^*_{1}, p_{0})$" and insert -- $\cdots, p^*_{2}, p^*_{1}, p_{0})$ --, therefor.

In Column 20, Line 28, delete "k-1,..., N" and insert -- k=1,..., N --, therefor.

In Column 21, Line 11, delete "he" and insert -- the --, therefor.

In Column 25, Line 46, delete "ODFM" and insert -- OFDM --, therefor.

In Column 25, Line 61, delete "$e^{j\omega_{1}.q2\Delta T}$" and insert -- $e^{j\omega_{i}.q2\Delta T}$ --, therefor.

In Column 28, Lines 11-12, delete "$T_{i.q}=t_{i.o}+q\Delta t'_{i}$" and insert -- $T_{i.q} = T_{i.o} + q\Delta T'_{i}$ --, therefor.

In Column 28, Line 51, in Equation (43), delete "$P\text{GRAD}]\text{GRAD}^*P$" and insert -- $P\text{GRAD}]^{-1}\text{GRAD}^*P$ --, therefor.

Signed and Sealed this  
Twenty-fourth Day of April, 2012

David J. Kappos  
*Director of the United States Patent and Trademark Office*